United States Patent [19]
Lee

[11] Patent Number: 5,964,569
[45] Date of Patent: Oct. 12, 1999

[54] PANEL POSITIONING DEVICE

[75] Inventor: Seok-Won Lee, Seoul, Rep. of Korea

[73] Assignee: Daewoo Electronics Co., Ltd., Seoul, Rep. of Korea

[21] Appl. No.: 08/940,982

[22] Filed: Sep. 30, 1997

[30] Foreign Application Priority Data

Jun. 30, 1997 [KR] Rep. of Korea .................. 97-28906

[51] Int. Cl.[6] .................................................. B25J 15/00
[52] U.S. Cl. ........................ 414/754; 414/749; 248/913; 269/71; 269/903
[58] Field of Search .................................... 414/749, 750, 414/754, 778, 779; 248/184.1, 913; 269/71, 73, 903; 108/137, 138

[56] References Cited

U.S. PATENT DOCUMENTS

| | | | |
|---|---|---|---|
| 4,077,722 | 3/1978 | Bicskei | 248/913 |
| 4,113,223 | 9/1978 | Kalizaki | 248/913 |
| 4,676,492 | 6/1987 | Shamir | 269/73 |
| 4,948,330 | 8/1990 | Nomura et al. | 269/73 |
| 4,998,712 | 3/1991 | Park et al. | 269/71 |
| 5,054,991 | 10/1991 | Kato | 269/71 |
| 5,173,029 | 12/1992 | Delventhal . | |
| 5,303,035 | 4/1994 | Luecke et al. | 108/138 |
| 5,323,712 | 6/1994 | Kikuiri | 108/138 |
| 5,659,939 | 8/1997 | Whitehouse | 269/71 |
| 5,760,500 | 6/1998 | Kondo et al. | 248/913 |
| 5,812,310 | 9/1998 | Stewart et al. | 108/137 |
| 5,829,571 | 11/1998 | Mizuta et al. | 414/749 |

FOREIGN PATENT DOCUMENTS

| | | | |
|---|---|---|---|
| 2646465 | 4/1978 | Germany | 414/749 |
| WO 95 01873 | 1/1995 | WIPO . | |

*Primary Examiner*—Dean Kramer
*Assistant Examiner*—Douglas Hess
*Attorney, Agent, or Firm*—Pillsbury Madison & Sutro LLP

[57] ABSTRACT

An improved panel positioning device which can be easily and accurately regulated by linearly regulating a heightwise displacement of the panel. A panel is mounted to an upper portion of a holder, and the holder is pivotally mounted to a holder support plate, a first regulating plate provided with first and second side plates on both sides is located below the holder support plate. First through fifth regulating knobs regulates a pivot angle, a lengthwise position, a widthwise position, a pivot angle about a lengthwise axis, and a heightwise position of the holder respectively. A third regulating plate for regulating the heightwise position of the holder is mounted to a side frame so as to be lengthwisely moved and is engaged with the fifth regulating knob at one side thereof. A first pin is fixed to the second regulating plate, and a linear inclined slit which extends from an upper portion of one lengthwise side thereof to a lower end of the other lengthwise side thereof and into which the first pin is inserted and penetrated is formed at one width side thereof. When the fifth regulating knob is rotated, the first pin of the second regulating plate is guided by the inclined slit. The second regulating plate is heightwisely moved with respect to the side frame and linearly proportional to the rotational displacement of the fifth regulating knob, and thus regulating the heightwise displacement of the panel easily and accurately.

25 Claims, 10 Drawing Sheets

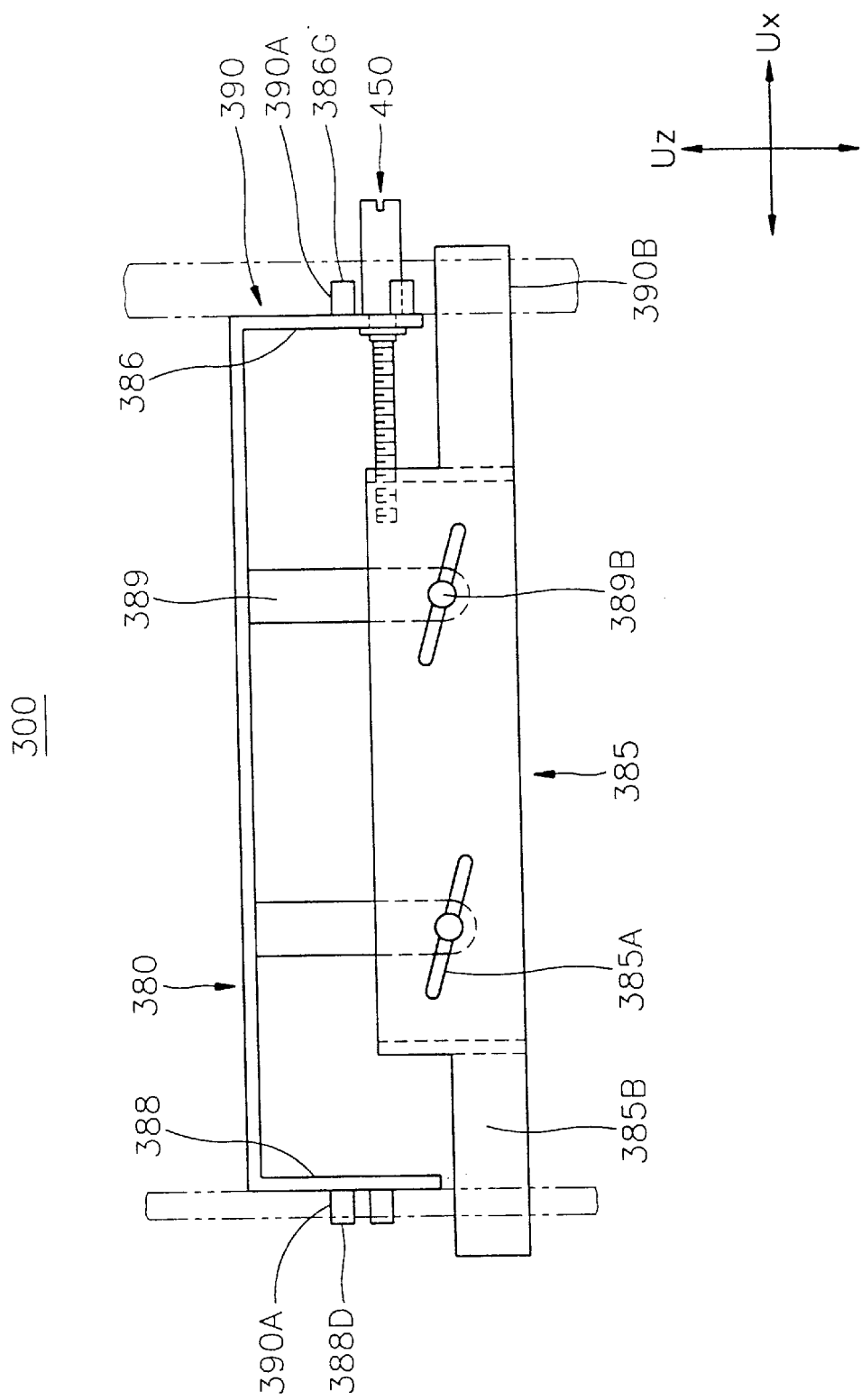

PANEL POSITIONING DEVICE

BACKGROUND OF THE INVENTION

1. Field of the Invention

The present invention relates to a panel positioning device, and more particularly to novel systems and methods for improving panel positioning in which a simple and accurate heightwise displacement of an AMA or LCD panel is linearly regulated by knobs.

2. Description of the Prior Art

Schematic drawings, FIGS. 1A and 1B, show a conventional panel positioning device 100 that regulates an AMA panel or the like. FIGS. 2A and 2B detail elements of the panel positioning device 100 shown in FIGS. 1A and 1B. FIG. 3 is a front sectional view of the panel positioning device 100 shown in FIGS. 1A and 1B.

The conventional positioning device 100 shown in FIGS. 1 through 3 includes a holder 120 to which a panel (not shown) is fixed, a middle plate 130, a holder supporting plate 140, a first regulating plate 150, a first side plate 160, a second side plate 170, and a second regulating plate 180.

The holder 120, shown in FIGS. 1 through 3, contains first and second bending portions 124 and 126 formed at the front and rear edges of a holder body 122 along the Uy direction, and a third bending portion 128 is formed at the right edge of the holder body 122 in Ux direction. First and second brackets, 124A and 126A respectively, extend upward at a substantial distance away from the third bending portion 128 and are at the middle of bending portions 124 and 126. Formed in the first and second brackets 124A and 126A are first and second pin holes 124B and 126B for pivotal mounting of the holder 120 to a holder supporting plate 140. Thereby, the holder 120 is pivotally mounted to the holder supporting plate 140. At corners of the holder body 122 are tapped holes 122A for mounting the panel 120.

Dual recesses 122C are formed along the Uy direction on the bottom surface of the holder body 122 to the either sides of a cut-away portion 122B. Inserted into each of the recesses 122C is top end of a spring 129 the bottom end is mounted unto a boss 142K formed in the holder support plate 140. The springs 129 force the holder 120 in the $\theta_y$ direction (the clockwise direction in the figures).

The holder opening 122D is formed at the center (the origin of axis Ux,Uy,Uz) of the holder body 120. The rectangular second holder openings 122E are formed to the right and left sides (the negative and positive Ux direction) of the first holder opening 122D and are separated from the first holder opening 122D by a distance.

The middle plate 130 includes a body 132 (hereinafter, referred to as a middle plate body) that is a rectangular plate. Rectangular protrusions 132B are formed at positive and negative Uy direction on the right side of the middle plate body 132. Through-holes 132C are formed in the center of protrusions 132B. Another protrusion 132D is formed at the halfway point between the first two protrusions 132B on the right side of the middle plate body 132.

A first circular opening 132E, has a diameter equal to that of the first holder opening 122D, is formed at the center of the middle plate body 132. A set of four circular openings 132F are formed on the diagonal axis, equal distance from the first opening 132E. A pair of rectangular openings 132G are formed at the negative Ux direction from the opening 132E of the middle plate body 132. Semi-spherical recesses 132H are formed along Uy axis in front and rear of the opening 132E. A set of through-holes 132I are formed at the left corners of the middle plate body 132.

Holder supporting plate 140 contains first and second bending portions 144 and 146 formed at the front and rear edges along Ux direction of a supporting body 142. Bending portions are bent parallel to Uy axis from the supporting body 142 and integrally formed with the supporting body 142. First and second supporting brackets 144A and 146A which protrude upwardly are integrally formed with the first and second bending portions 144 and 146 along Uz axis at the center of bending portions 144 and 146. Formed in the first and second supporting brackets 144A and 146A are first and second pin holes 144B and 146B for pivotal mounting the holder 120 to the holder supporting plate 140 by pins 125.

The holder supporting plate 140 has a symmetrical rectangular cut-away portions at the right end. The rectangular cut-away are formed such that they are separated in Uy direction of the holder supporting plate 140 and are opposite to each other. The holder supporting plate 140 has a first protrusion 142A at the center of Uy axis and second rectangular protrusions 142B on the front and rear sides of the first protrusions 142A. At both edges of the first protrusion 142A, guide members 142C are bent by ninety degree and protruded upward. A cam member 142C is interposed between the guide members 142C, and is guided by the guide member 142C when the cam member 214 is moved in the left or right direction (the Ux direction). A set of rectangular openings 142D are formed on the second protrusion 142B. The side cross section of the cam member 214 is right-angled triangular wedge-like and has a constant thickness, therefore the cam member 214 has two side surfaces, a rear surface, and an inclined surface 214B. A tapped hole 214A is formed parallel to the normal line of the right side surface at the center portion of the right surface of the cam member 214. The screw portion 210D of the first regulating knob 210 is engaged with the tapped hole 214A of the cam member 214.

A third supporting bracket 148 is bent by ninety degrees and protrude upward at the right end (along Ux axis) of the first protrusion 142A. At the center of the third supporting bracket 148 is a third pin hole 148A for rotationally mounting of the first regulating knob 210 to the third supporting bracket 148.

The first knob 210 has following elements; a cylindrical head 210A, a pin 210B, a jaw 210C, and a screw 210D. A slot is formed on the end of the head 210A such that the first knob 210 can be rotated by a driver or the like, and the pin 210B is integrally protruded from the opposite surface from the head 210A. The jaw 210C is integrally formed in the pin 210B on the side opposite to the head 210A, and the screw 210D is integrally formed from the jaw 210C. The outer diameter of the jaw 210C is a slightly smaller than that of the third pin hole 148A. The first regulating knob 210 is inserted into the third regulating bracket 148 from the right to the left (along Ux axis), and then an interlocking member 212 having an outer diameter larger than that of the third pin hole 148 is inserted between the right side surface of the jaw 210C and the left side surface of the first regulating knob 210 thus rotationally mounting the first regulating knob 210 to the third supporting bracket 148. The screw 210D of the first regulating knob 210 is engaged with the tapped hole 214A of the cam member 214.

Initially when the head 210A of the first regulating knob 210 is rotated by a driver or the like, the first regulating knob 210 is not moved in the left or the right direction (the Ux direction), but is rotated in place. The cam member 214 engaged when the screw 210D of the first regulating knob 210 is moved in the left or the right direction(the Ux direction). Then, the inclined surface 214B of the cam member 214 makes contact with the lower end of the third bending portion 128 of the holder 120, thereby pivoting the holder 120.

At the center of the supporting body 142 is formed a first circular supporting opening 142E having a diameter equal to the first holder opening 122D. The second set of circular supporting opening, four circular openings 142F are formed on the diagonal axis, equal distance from the opening 142E. Third rectangular supporting opening 142G are formed at corners of the holder body 142. The fourth rectangular supporting opening 142H are formed on the right and left sides of the first and second supporting brackets 144 and 146.

The supporting body 142 at the left end has a cut-away portions that are symmetrically formed to the front and rear sides of axis $U_x$. The supporting body 142 has a third protrusion 142I at a middle position of the left end. The fourth protrusions, called 142J are formed at the front and rear of the third protrusion 142I and left end of supporting body 142. Bosses 142K are protruded upward in the fourth protrusions 142J of the supporting body 142. Mounted in into each of the bosses 142K is the one end of the corresponding spring 129 the other end of which are inserted into the corresponding recess 122C of the holder 120. The springs force the left ends of the holder 120 upward, thereby maintaining the left lower corner of the holder 120 in contact with the inclined surface 214B of the cam member 214. In the positive Uy direction respect to the first and second supporting brackets 144 and 146 are pin holes 142M and 142L. Inserted and fixed, from below, into these pin holes are the first and second guide pins 145 and 147.

FIG. 2B shows a rectangular cut-away portion 152A formed at the right end of the first regulating plate body 152. The bracket 154 (hereinafter, referred to as a second regulating knob bracket) is bent downward by ninety degrees at and protrudes from the right edge of the cut-away portion 152A. The bracket 154 is for rotationally mounting the second regulating knob 220. Formed in the second regulating knob bracket 154 is a pin hole into which a second regulating knob 220 is inserted and mounted. Cut-away portions 152B and 152C are respectively formed at the front and rear ends of the first regulating plate body 152 and are separated to the left by a distance from the lengthwise middle position of the first regulating body. Brackets 156 and 158, (hereinafter, referred to as third and fourth regulating brackets respectively) for rotationally mounting the third and fourth regulating knob 230 and 240, is bent downward by ninety degrees at and protrudes from the right ends of the cut-away portions 152B and 152C. Pin holes 156A and 158A are respectively formed in the third and fourth regulating knob brackets 156 and 158 such that the third and fourth regulating knobs 230 and 240 are inserted into and mounted to the pin holes 156A and 158A.

The shapes and the mounting manners of the second, third, and fourth regulating knobs 220, 230, and 240 are similar to those of the first regulating knob 210. Therefore the explanation about shapes and mounting manners of these are omitted.

Slits 152D are formed along the length of the first regulating body 152, (in the Ux direction) at the front and rear of the right side of the first regulating plate body 152. The side plate 160 includes a body 162 (hereinafter, referred to as a first side plate body) in which a bending portion 164 are integrally formed on one side thereof (rear end portion thereof in the figures). A first circular opening 152E, with a diameter equal to that of the first holder opening 122D, is formed at the center (the origin of axis Ux,Uy,Uz) of the first regulating plate body 152. A set of four circular second openings 152F are on the diagonal axis, equal distance from the first opening 152E. Third set of rectangular openings 152G are respectively formed at the corners of the first regulating plate body 152.

A set of two tapped holes, the first tapped holes 152H and the second tapped holes 152I are for mounting respectively the first and second side plates 160 and 170 to the first regulating plate body 152. These are formed at the front and rear portions of the first regulating plate body 152. The through-holes 152J are formed to the interior and parallel to the first and second tapped holes 152H and 152I. A slit 152K is formed in a widthwise direction(in the Uy direction), at the middle of the first tapped holes 152H, and similarly a rectangular opening 152M is formed at a middle of the second tapped holes 152I. A set of slits 152N are formed along the Ux direction, at the front and rear portions of the left side of the first regulating plate body 152. A set of guide bosses 152P protruding downward are formed at a middle position of the left third openings 152G and at a middle position of the right third openings 152G.

The first side plate 160 is mounted to the first regulating plate body 152 at a front portion of the first regulating plate body 152. Slits 162A are respectively formed at the right and left portions of the first side plate body 162. The first side plate 160 is mounted to the first regulating plate 150 by inserting screws 166 into the slits 162A and then by engaging the screws 166 with the first tapped holes 152H of the first regulating plate 150. Spacers 166A are inserted between the first side plate 160 and head portions of the screws 166.

After the panel positioning device is assembled, the head portions of the screws 166 from the upper surface of the first regulating plate 150 protrudes through the four support openings 142H of the holder supporting plate 140. Through-holes 162B are formed to the rear of the slits 162A at positions corresponding to the through-holes 152J of the first regulating plate 150 when the first side plate 160 is mounted to the first regulating plate 150.

A guide slit 162C extending from the left rear to the right front thereof is formed in the first side plate 160 at a middle position of the slits 162A. When the panel positioning device is assembled, the first guide pin 145 of the holder supporting plate 140 is penetrated into and guided by the slit 152K of the first regulating plate 150 and the guide slit 162C of the first side plate 160.

Integrally formed at the right end of the first side plate 160 is a bracket 168 (hereinafter, referred to as a first side bracket) which is bent by ninety degrees and protrudes downward. Formed in the first side bracket 168 is a tapped hole 168A which is engaged with the screw portion 230D of the third regulating knob 230. When the screw 166 is engaged with the first tapped hole 152H and the third regulating knob 230 is rotated, the screw 166 and the spacer 166A are guided by the slit 162A and the first guide pin 145 of the holder supporting plate 140 is guided by the slit 152K formed in the first regulating plate 150 and the guide slit 162C formed in the first side plate 160.

The second side plate 170 is mounted to the first regulating plate body 152 at a rear portion of the first regulating plate body 152. The second side plate 170 includes a body 172 (hereinafter, referred to as a second side plate body) with which a bending portion 174 is integrally formed on one side thereof. Slits 172A are respectively formed along the length of the second side plate body 172, in the Ux direction, at right and left portions of the second side plate body 172. The second side plate 170 is mounted to the first regulating plate 150 by inserting the screws 176 into the slits 172A and t hen by engaging the screws 176 with second tapped holes 152I of the first regulating plate 150. Spacers 176A are inserted between the second side plate 170 and the head portions of the screw 176. When the screws 176 are engaged with the second tapped holes 152I and the fourth regulating knob 24 0 is rotated, the screws 176 and the spacers 176A are guided by the slits 172A.

After the panel positioning device is assembled, the head portions of the screws 176 from the upper surface of the first regulating plate 150 protrudes through the fourth supporting openings 142H of the holder supporting plate 140. Through-holes 172B are formed to the front of the slits 172A at positions which correspond to the through-holes 152J of the first regulating plate 150 when the second side plate 170 is mounted to the first regulating plate 150.

A widthwise guide slit 172C is formed at a middle position of the slits 172A. After the panel positioning device is assembled, the second guide pin 147 of the holder supporting plate 140 is penetrated into and guided by the opening 152M formed in the first regulating plate 150 and the guide slit 172C which is formed in the second side plate 160 in a widthwise direction, in the Uy direction.

Integrally formed at the right end of the second side plate 170 is a bracket 178 (hereinafter, referred to as a second side bracket) which is bent by ninety degrees and protrudes downward. Formed in the second side bracket 178 is a tapped hole 178A which is engaged with the screw portion 240D of the third regulating knob 240. When the screw 176 is engaged with the second tapped hole 152I and the fourth regulating knob 240 is rotated, the screws 176 and the spacers 176A are guided by the slit 172A and the second guide pin 147 of the holder supporting plate 140 is guided by the opening 152M formed in the first regulating plate 150 and the guide slit 172C formed in the second side plate 170.

The second regulating plate 180 has a body 182 (hereinafter, referred to as a second regulating plate body) that is a rectangular plate. Rectangular first protrusions 182A, with a first tapped holes 182B, protrudes parallel to each other at the front and rear corners of the right side of the second regulating plate body 182. On the opposite end of the second regulating plate body 182, is the second semi-spherical protrusions 182C that protrudes at the front and rear corners.

The middle plate 130, the holder supporting plate 140, and the first regulating plate 150 are mounted to the second regulating plate 180 by mounting members 123 and screws 129. Each of the mounting members 127 has a inverse U-shaped cross sectional plate, followed by a flexible portion 127A of semi-spherical shape, which protrudes downward at a middle portion thereof. Mounting portions 127B are formed at the both edges of the mounting members 127 and are bent by ninety degrees. A through-hole 127C is formed in each of the mounting portion 127B.

The mounting members 127 are penetrated through the second holder openings 122E and mounted such that the flexible portions 127A presses the resilient portions 127A of the middle plate 130 and a connecting portion between the third openings 132G respectively. The screws 123 are engaged with the tapped-holes 182H of the second regulating plate 180, and spacers 123A are interposed between the screws 123 and the second regulating plate 180.

A first circular opening 182E which has a diameter equal to that of the first holder opening 122D is formed at the center of the second regulating plate body 182. A set of four circular second openings 182F are on the diagonal axis, equal distance from the first opening 182E. Guide slits 182G are respectively formed between the first opening 182E and the right and left ends of the second regulating plate body 182 along the length of the second regulating plate body 182, in the Ux direction. Bosses 152P formed in the first regulating plate 150 are respectively inserted into and guided by the guide slits 182G. Third tapped holes 182H are formed to the front and rear sides of each guide slits 182G so as to be adjacent to the front and rear sides of the second regulating plate body 182.

A first rectangular plate bracket 186 which is bent downward by ninety degrees from the second regulating plate body 182 is protruded at the right edge which connects the first protrusions 182A of the right end of the second plate body 182. A tapped hole 186A with which the screw-portion of the second regulating knob 20 is formed at the center portion of the first bracket 186, and a through-hole 186B to which one side of the fifth regulating knob 250 is rotationally mounted is formed to the lower side of the tapped hole 186A. Rectangular protrusions 186C each having a tapped hole 186D are respectively formed on the front and rear sides of the first bracket 186 at the lower portions of the first bracket 186. Upper and lower pin holes 186F are formed to the front and rear sides of the through-hole 186B respectively and separated from the through-hole 186B by a widthwise distance, such that the corresponding upper and lower pin holes 186F of the front and rear sides of the first bracket 186 are located at the same Uz positions. A set of pins 186G are inserted into and fixed to the pin holes 186F.

Bending portions 184 are formed at the front and rear ends of the second regulating plate body 182 respectively. The bending portions 184 are integrally formed with the second regulating plate body 182 so as to be bent downward by ninety degrees from the front and rear ends of the second regulating plate body 182.

A second bracket 188 is bent by ninety degrees and protrudes from the front and rear sides of the second protrusion 182C at the left end of the second regulating plate body 182. The second bracket 188 is a U-shaped plate in which a front protrusion is bent and protrudes from the front of second protrusion 182C. While the rear protrusion is bent and protrudes from the rear of second protrusion 182C. Front and rear protrusions are connected by a connecting portion, and a through-hole 188A, at the center of connecting portion, to which the other side of the fifth regulating knob 250 is rotationally mounted. Tapped holes 188B are respectively formed to the front and rear sides of the through-hole 188A. Two pin holes 188C are formed in the front protrusion of the second bracket 188, and two pin holes 188C are formed in the rear protrusion of the second bracket 188 at positions corresponding to the heights of the pin holes 188C of the rear protrusion of the second bracket 188. Pins 188D are inserted into and fixed to the pin holes 188C of the second bracket 188 respectively. The pins 186G and 188D which are fixed to the pin holes 186F and 188C of the first and second brackets 186 and 188 are inserted into slits which are formed in the side frame (not shown) in the Ux direction.

The fifth knob 250 includes two cam members 252A and 252B and a connecting tube 258. Each of the cam members 252A and 252B has a cylindrical head portion 254A and 254B a recess formed on one cross section thereof, and an insertion portion 256A and 256B. The insertion portion is integrally formed on the other cross section of the head portion 254A and 254B and is eccentrically protruded and rotatably inserted into the through-hole 186B and 188A of the first or second bracket 186 or 188. Small through-holes 257A and 257B are respectively formed at free ends portion of the insertion portion 256A and 256B so that pins 259 can be inserted thereinto. The pins 259 is inserted into the through-holes 258A and 258B of the connecting tube 258 and the through-holes 257A and 257B of the cam member 252A and 252B, and thus the cam members 252A and 252B are mounted to the connecting tube 258.

Initially when the head portion 210A of the first regulating knob 210 is rotated, the first regulating knob 210 is not moved in the right and left direction, the Ux direction, and is rotated in place. The cam member 214 engaged when the screw portion 210D of the first regulating knob 210 is moved in the right and left direction, the Ux direction. Then, since the inclined portion 214B of the cam member 214 remain in contact with the lower end of the third bending portion 128 of the holder 120, the holder 120 is pivoted about the hinge axes of the first and second supporting brackets 144 and 146 in the θy direction and the springs 129 press the holder 120 in the θy direction (especially, in the clockwise direction in FIG. 2A). The θy directional angle of the panel 120 is regulated when the holder 120 to which the panel (not shown) is fixed is pivoted in the θy direction by the regulation of the first regulating knob 210.

When the second regulating knob 220 is rotated, the second regulating knob 220 is not moved in the right or left direction, in the Ux direction but is rotated in place. The distance between the first bracket 186 of the second regulating plate 180 which is engaged with the screw portion 220D of the second regulating knob 220 and the second regulating knob bracket 154 of the first regulating plate 150 becomes shorter or longer, and thus the first regulating plate 150 is moved in the lengthwise direction, in the Ux direction, in relation to the position of the second regulating plate 180. Then, the guide slits 182G of the second regulating plate 180 make contact with the guide bosses 152P of the first regulating plate 150 and guide the movement of the first regulating plate 150. Therefore the first regulating plate 150 is moved in the lengthwise direction on the second regulating plate 180 by rotating the second regulating knob 220. The positions of both the middle plate 130 and the second regulating plate 180 remains fixed, the first and second guide pins 145 and 147 respectively penetrated into the widthwise slit 152K of the first regulating plate 150, the opening 152M of the first regulating plate 150, and the guide slit 162C of the first side plate 160, and the widthwise slit 172C of the second side plate 170. Thus the holder supporting plate 140 is mounted to the second regulating plate 150, thereby fixed in the lengthwise direction thereof, in the Ux direction, and moves along with the first regulating plate 150 in the lengthwise direction, in the Ux direction. As the holder supporting plate 140 is moved in the lengthwise direction thereof, in the Ux direction, the holder 120 pivotally mounted to the holder supporting plate 140 and the panel (not shown) also fixed to the holder 120 is moved in the lengthwise direction thereof, in the Ux direction.

When the third knob 230 is rotated, the screws 166 and the spacers 166A are guided by the slits 162A of the first side plate 160, and the first guide pin 145 of the holder supporting plate 140 is guided by the slit 152K formed in the first regulating plate 150 and the guide slit 162C of the first side plate 160. Then, the distance between the first side bracket 168 of the first side plate 160 and the third regulating knob bracket 156 of the first regulating plate 150 becomes longer or shorter, and the holder supporting plate 140 is moved by the guide pin 145 of the holder supporting plate 140 with respect to the first regulating plate 150 in the lengthwise direction thereof, in the Uy direction. The first regulating plate 150 is mounted so as to be fixed with respect to the second regulating plate 180 by the guide slits 182G of the second regulating plate 180 and the guide bosses 152P of the first regulating plate 150. Therefore the positions of the first and second regulating plates 150 and 180, the middle plate 130, and the first and second side plates 160 and 170 remain fixed and the holder supporting plate 140, the holder 120, and the panel (not shown) are moved in the lengthwise direction of the apparatus, i.e., in the Uy direction.

When the apparatus is regulated by the rotation of the fourth regulating knob 240, the distance between the second side bracket 178 of the second side plate 170 and the fourth knob bracket 158 becomes shorter or longer. The screws 176 and 176A engaged with the second tapped holes 152I of the first regulating plate 150 respectively guide the second side plate 170 in the lengthwise direction of the apparatus, and the second side plate 170 is moved in the lengthwise direction of the apparatus, in the Ux direction. Then, the second guide pin 147 inserted into the holder supporting plate 120 is moved in the lengthwise direction by the widthwise slit 172C of the second side plate 170, and the holder supporting plate 120 is rotated in the θz direction about the first guide pin 145 penetrated into the slit 152K of the first regulating plate 150 and the guide slit 162C formed in the first side plate 160.

When the fifth regulating knob 120 is rotated, the peripheral surfaces of the head portions 254A and 254B eccentrically formed in the insertion portion 256A and 256B of the cam member 252A and 252B respectively make contact with the Uy-directional slits 190A of the side frame 190, and the second regulating plate 180 is moved with respect to the side frame (not shown) in the heightwise direction, i.e., in the Uz direction. Then, The pins 186G and 188D fixed to the first and second brackets 186 and 188 of the second regulating plate 180 are respectively inserted into and guided by the heightwise, i.e., Uz-directional slits 190B and 190C formed in the side frame (not shown).

However, in the conventional panel positioning apparatus, since the Uz-directional movement of the panel (not shown) is accomplished by the eccentric cam members 252A and 252B, the Uz-directional displacement of the panel (not shown) is not linearly proportional to the rotational displacement of the fifth regulating knob 250. More particularly, the relationship between the Uz-directional displacement ΔZ of the panel and the rotational displacement ΔΦ of the fifth regulating knob 250 is as follows:

$$\Delta Z = R1 \sin(\Delta\Phi)$$

wherein R1 represents the centers of the insertion portions 256A and 256B of the fifth regulating knob 250 and the centers of the head portions 252A and 252B of the fifth regulating knob 250.

Namely, the Uz-directional displacement ΔZ of the panel is nonlinearly proportional to the rotational displacement ΔΦ of the fifth regulating knob 250 by the trigonometric functional relationship. Therefore, it is not easy to regulate the Uz-directional displacement ΔZ of the panel accurately, and a great effort is needed in order to regulate the position of the panel. Especially, if the panel positioning operation of the conventional panel positioning apparatus is automated, and if the Uz-directional displacement ΔZ of the panel is non-linearly controlled, more data are needed for the control and the control accuracy is lowered compared to a linear control.

SUMMARY OF THE INVENTION

In view of the foregoing, it is a primary object of the present invention to provide an improved panel positioning device in which a heightwise displacement of an AMA or LCD panel is linearly regulated by a knob and thus the panel can be easily and accurately regulated.

Consistent with the foregoing objects, and in accordance with the invention as embodied and broadly described herein, a panel positioning device is disclosed in one embodiment of the present invention as including:

a holder to which a panel is mounted;

a holder supporting plate to which the holder is rotatably mounted;

a middle plate interposed between the holder and the holder supporting plate;

a first regulating plate located below the holder supporting plate;

a first side plate provided on one widthwise side of the first regulating plate;

a second side plate provided on the other widthwise side of the first regulating plate;

a cam member provided on the holder supporting plate so as to make contact with one side of the holder, and in which a tapped hole is formed;

a first regulating knob provided on one side of the holder supporting plate and provided with a screw portion engaged with the tapped hole of the cam member, for regulating a relative pivot angle of the holder with respect to the holder support plate;

a second regulating knob provided on one side of the first regulating plate and provide with a screw portion engaged with the second regulating plate, for regulating a relative lengthwise position of the first regulating plate with respect to the second regulating plate;

a third regulating knob provided on one side of the first regulating plate and provided with a screw portion engaged with the first side plate, for regulating a relative widthwise position of the holder support plate with respect to the first regulating plate;

a fourth regulating knob provided on one side of the first regulating plate and provide with a screw portion engaged with the second side plate, for regulating a relative pivot angle of the holder support plate about one heightwise axis of the first regulating plate with respect to the first regulating plate;

a fifth regulating knob for regulating a regulative heightwise position of the holder support plate with respect to a side frame; and means for linearly regulating a relative heightwise position of the second regulating plate with respect to the side frame by engaging with the fifth regulating knob.

According to one aspect of the present invention, the means for linearly regulating heightwise position of the second regulating plate is a third regulating plate which is lengthwisely movably mounted to the side frame, and with which the fifth regulating knob is engaged at one side thereof.

At least one first pin is fixed to the second regulating plate, the first pin being inserted and penetrated into a corresponding side of the third regulating plate, the third regulating plate having a inclined slit extending from an upper portion of one side thereof to a lower portion of the other side thereof.

The second regulating plate has at least one bracket to which the first pin is fixed, the inclined slit being formed on a side wall of the third regulating plate corresponding to the bracket of the second regulating plate.

According to the panel positioning device of the present invention, a heightwise displacement of a panel fixed to a holder is regulated so as to be proportional to the rotational displacement of the fifth regulating knob.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through the use of the accompanying drawings in which:

FIG. 6 is a front view of the panel positioning device shown in FIGS. 4A and 4B.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 4A through 6, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Hereinafter, a panel positioning device according to a preferred embodiment of the present invention will be explained in more detail with reference to the accompanying drawings.

Figure 1A:
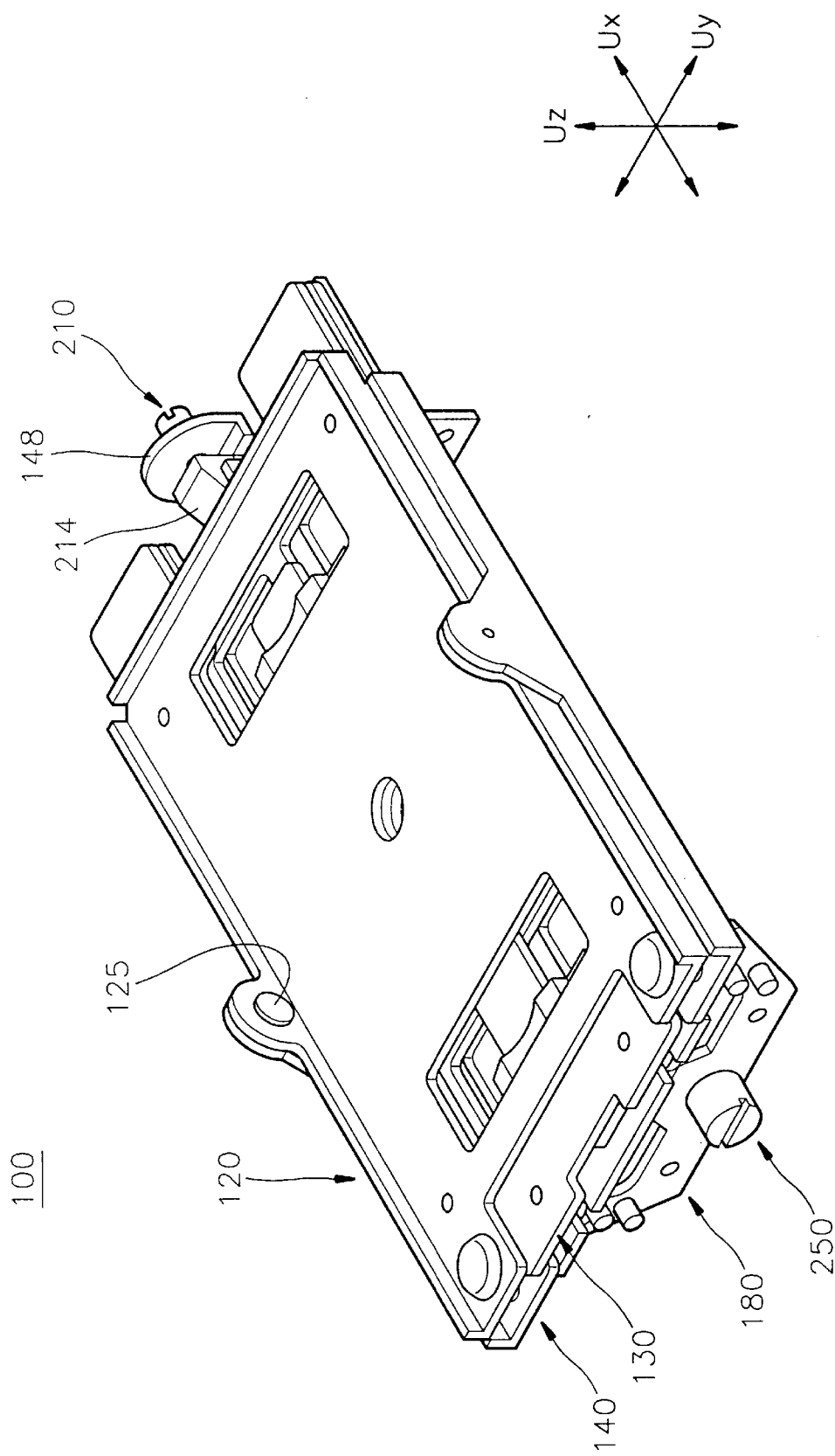
FIGS. 1A and 1B are perspective views for schematically showing a conventional panel positioning device.
Figure 1B:
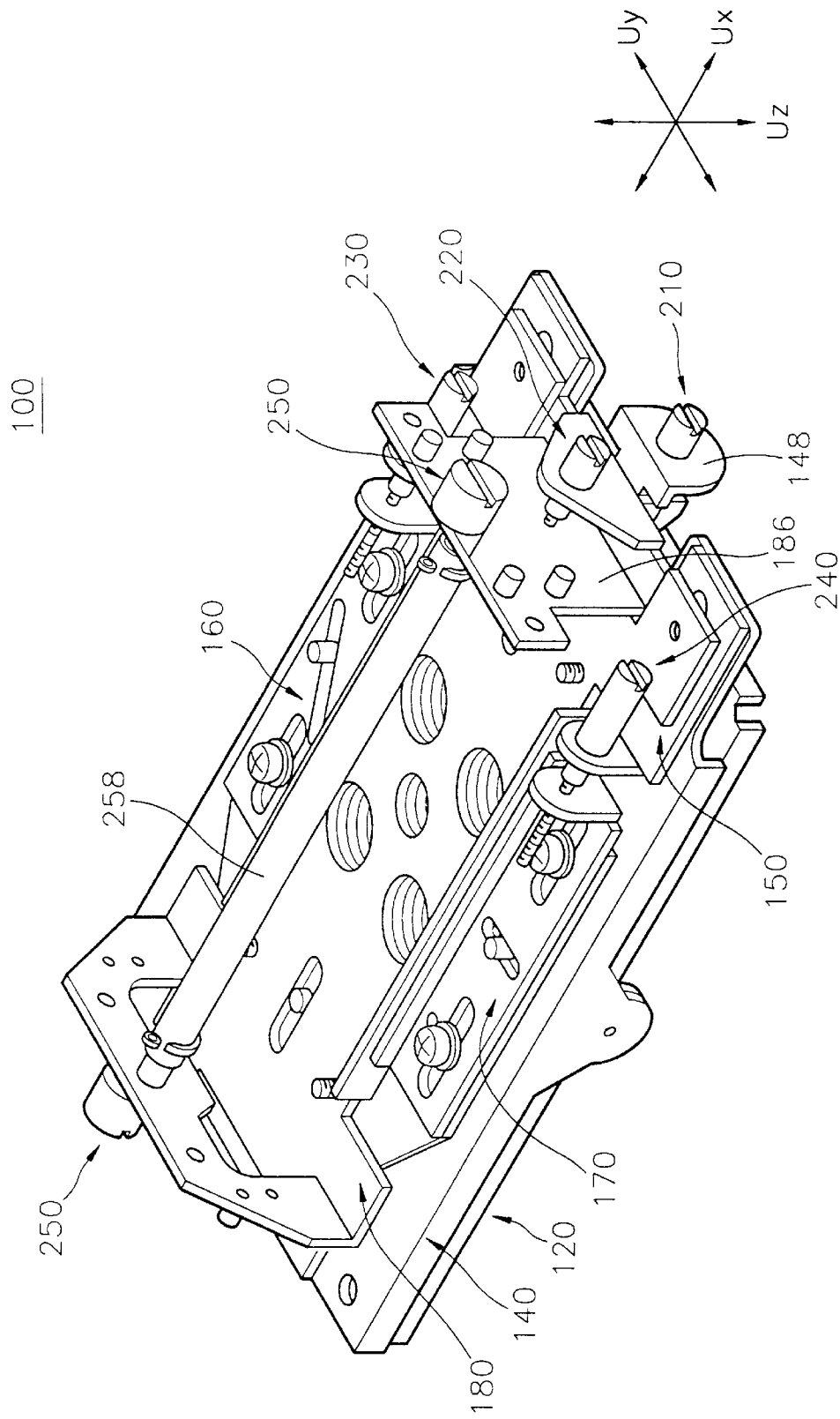
Figure 2A:
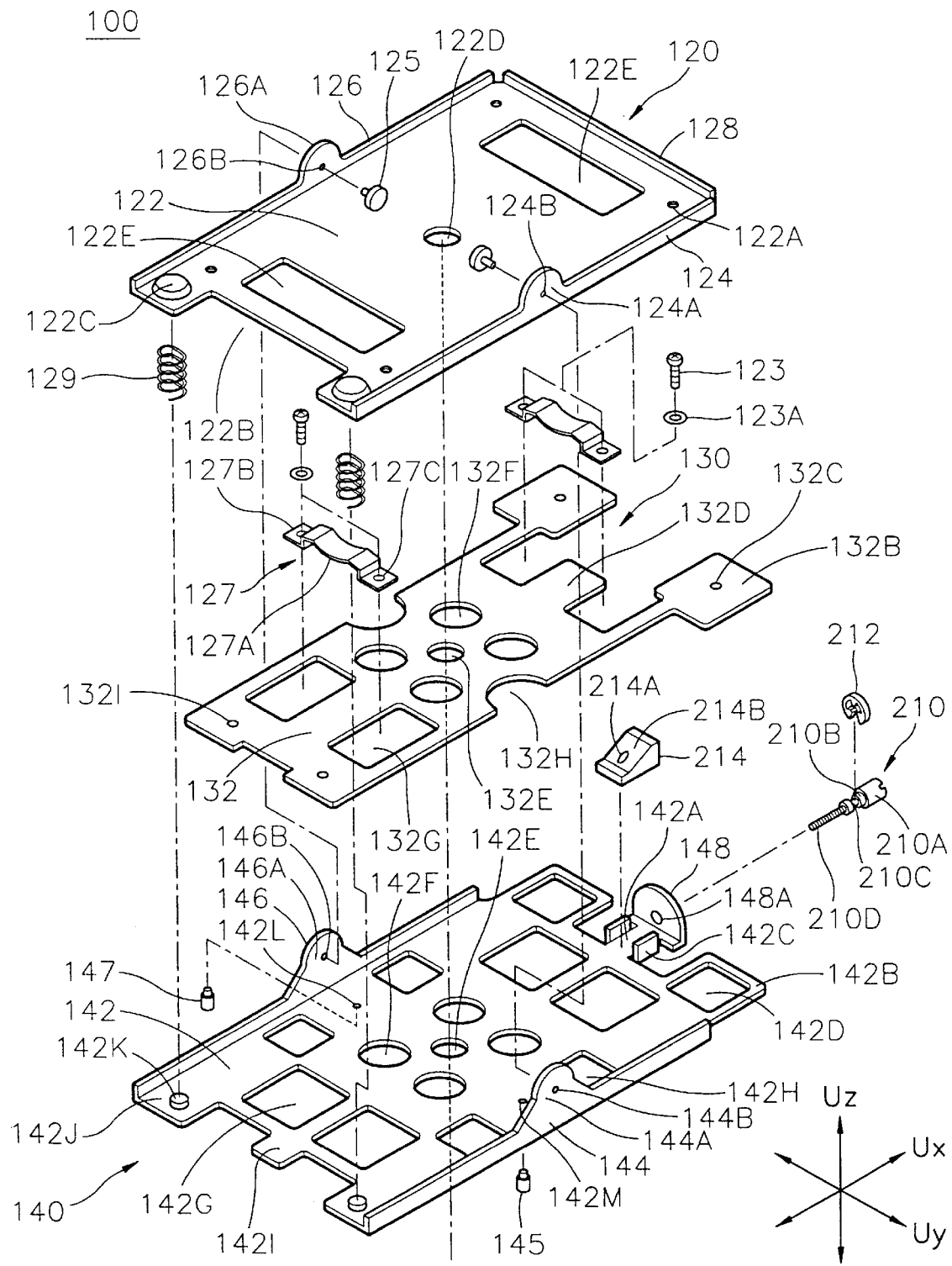
FIGS. 2A and 2B are exploded perspective view for showing elements of the panel positioning device shown in FIGS. 1A and 1B.
Figure 2B:
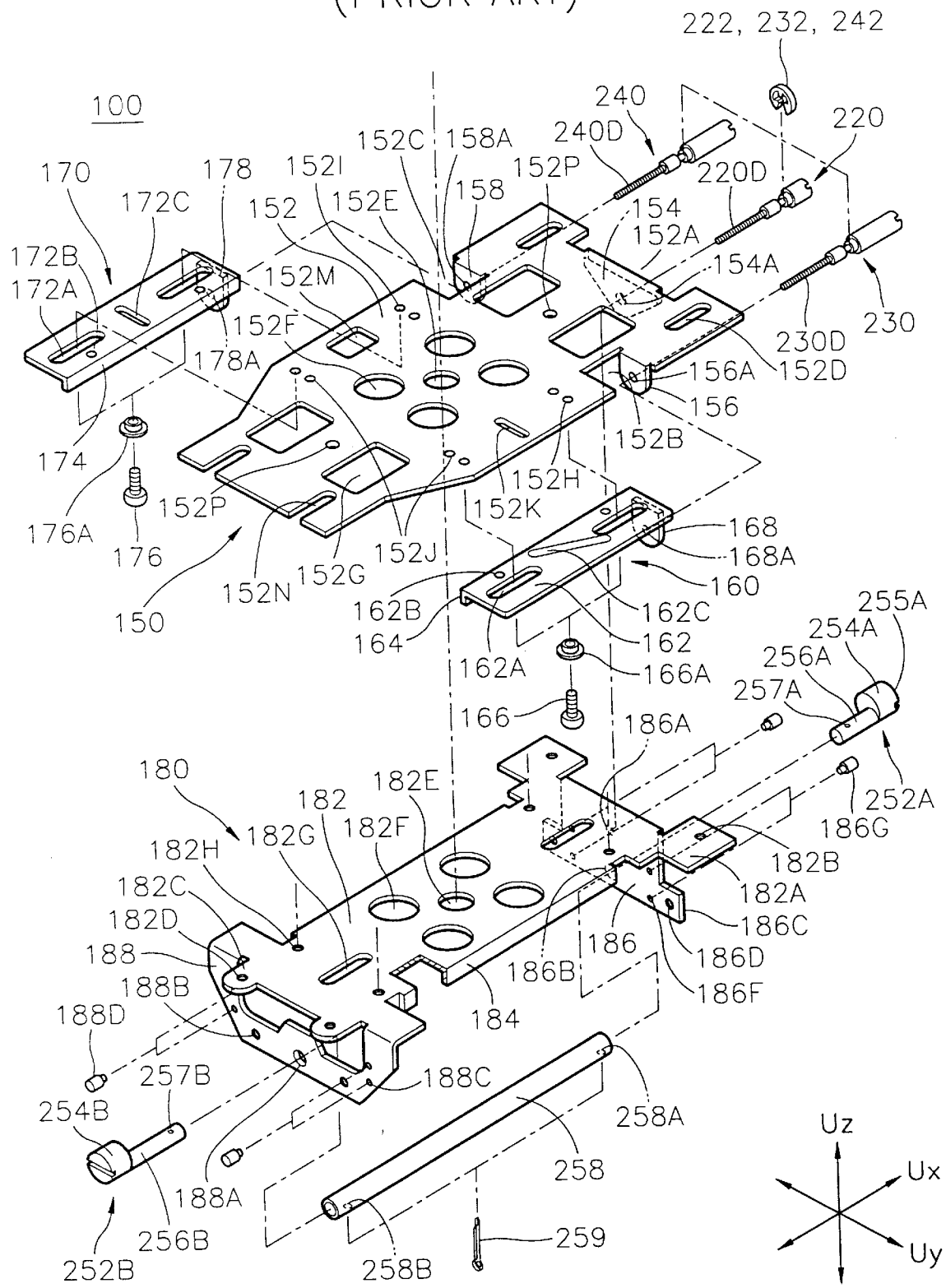
Figure 3:
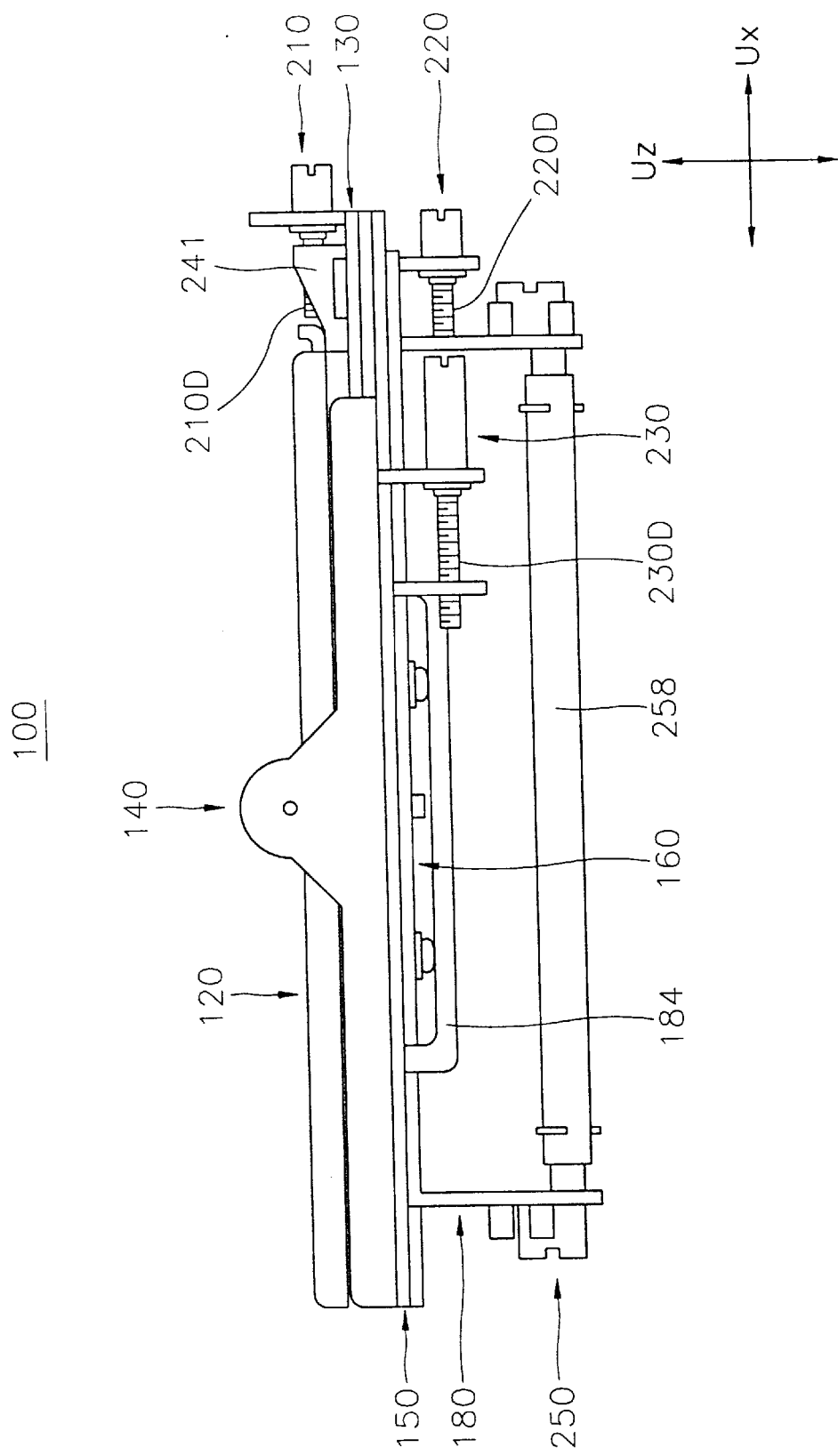
FIG. 3 is a front view of the panel positioning device shown in FIGS. 1A and 1B.
Figure 4A:
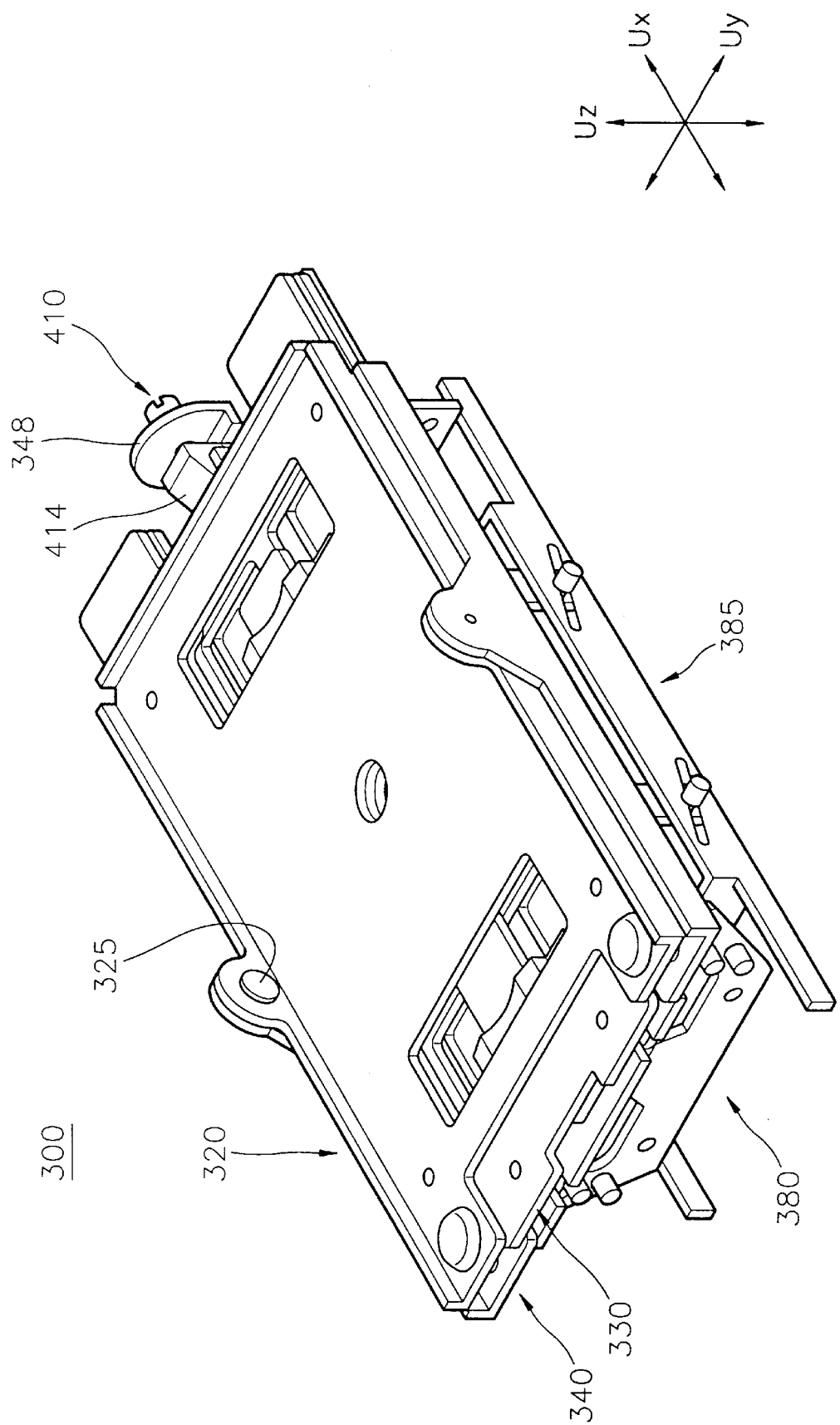
FIGS. 4A and 4B are perspective views for schematically showing a panel positioning device according to a preferred embodiment of the present invention.
Figure 4B:
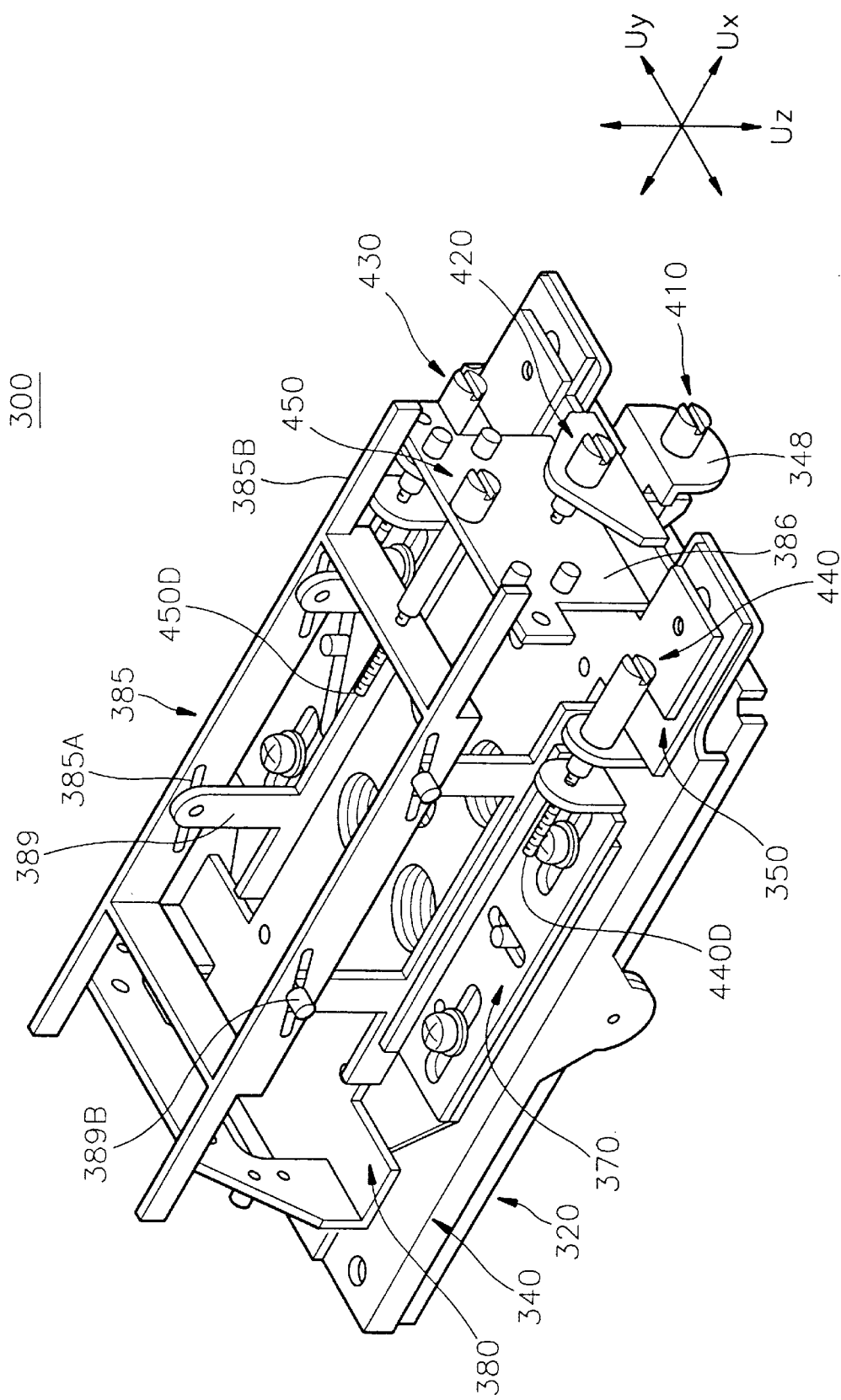
Figure 5A:
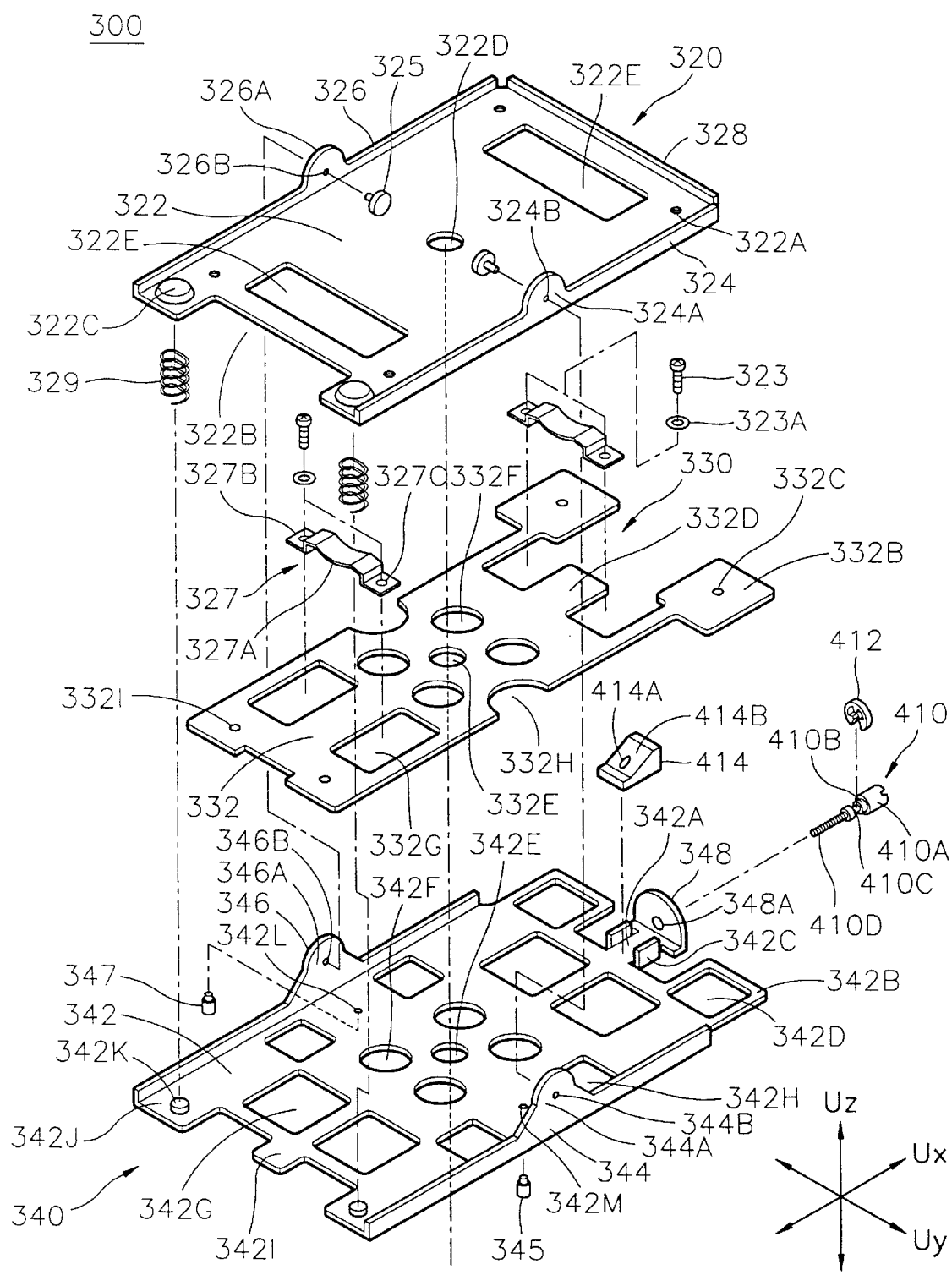
FIGS. 5A and 5B are exploded perspective view for showing elements of the panel positioning device shown in FIGS. 4A and 4B.
Figure 5B:
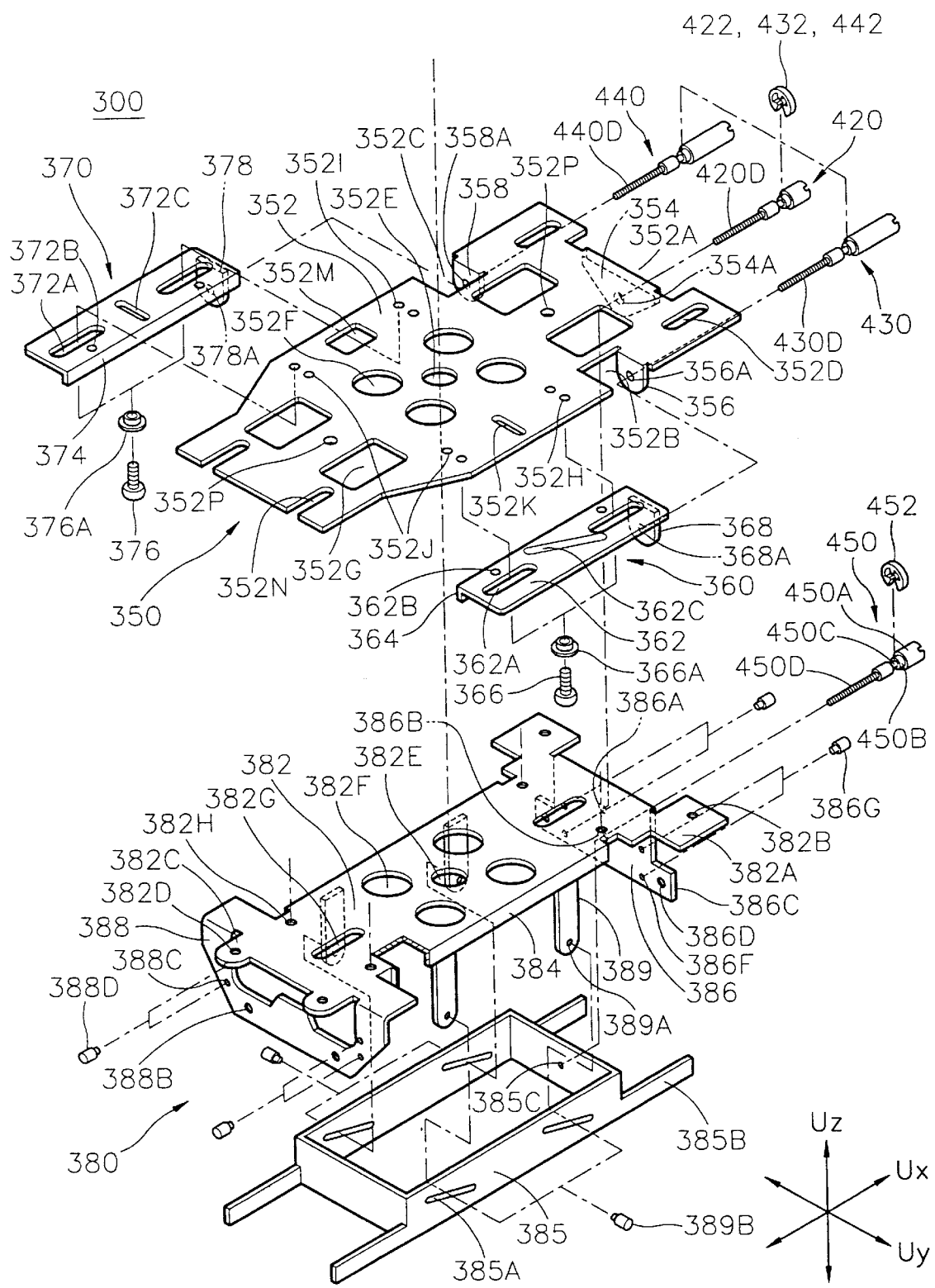

FIGS. 4A and 4B schematically show a conventional panel positioning device 300 for regulating a AMA panel or the like. FIGS. 5A and 5B show elements of the panel positioning device 300 shown in FIGS. 4A and 4B. FIG. 3 is a front sectional view of the panel positioning device 300 shown in FIGS. 4A and 4B.

The conventional positioning device 300 shown in FIGS. 4A through 5B includes a holder 320 to which a panel (not shown) is fixed, a holder supporting plate 340 to which the holder 320 is pivotally mounted and which is provided with a first regulating knob 410 on the left side thereof, a middle plate 330 which is interposed between the holder 320 and the holder supporting plate 340, a first regulating plate 350 which is located below the holder supporting plate 340 and is provided with a second regulating knob 420 on the right side thereof and the third and fourth regulating knobs 430 and 440 on the front and rear sides thereof, a first side plate 360 which is provided along widthwise of the first regulating plate 350 and is engaged with a screw portion 430D of the third regulating knob 430, a second side plate 370 which is engaged with a screw portion 440D of the fourth regulating knob 440, and a second regulating plate 380 which is located below the first regulating plate 350, and to which the middle plate 330 is mounted, and which is engaged with a screw portion 420D of the second regulating knob 420, and a third regulating plate 385 which is mounted to the side frame so as to be lengthwisely moved and is engaged with the screw portion 450D of the fifth regulating knob 450 on one side thereof.

The holder 320 includes a body 322 (hereinafter, referred to as a holder body) of substantially rectangular plate. First and second bending portions 324 and 326 are formed at the front and rear edges of a holder body 322, and a third bending portion 328 is formed at the right edge of the holder body 322. The first through third bending portions 324, 326, and 328 are integrally formed with the holder body 322 and are bent from the holder body 322 by ninety degrees. First and second brackets 324A and 326A, respectively extend upward at a substantial distance from the third bending portion 328 and are at the middle of the first and second bending portions 324 and 326.

Formed in the first and second brackets 324A and 326A are first and second pin holes 324B and 326B respectively for pivotally mounting the holder 320 to a holder supporting plate 340. Pins 325 are inserted into the first and second pin holes 344B and 346B of the first and second supporting brackets 344A and 346A. Which corresponds to the first and second pin holes 324B and 326B of the first and second holder brackets 324A and 326A. Thus the holder 320 is pivotally mounted to the holder supporting plate 340. At corner of the holder body 322 are a set of four tapped holes 322A for mounting the panel 310.

A rectangular cut-away portion 322B is formed on the left side of the holder body. Recesses 322C are formed on the bottom surface of the holder body 322 to the front and rear sides of a cut-away portion 322B, and inserted into each of the recesses 322C is one end of a spring 329 the other end of which is mounted unto a boss 342K formed in the holder support plate 340. The springs 329 force the holder 320 in the θy direction (the clockwise direction in the figures).

A first holder opening 322D is formed at the center of the holder body 320, and rectangular second holder openings 322E are respectively formed to the right and left sides of the first holder opening 322D and are separated from the first holder opening 322D by a distance.

The middle plate 330 includes a body 332 (hereinafter, referred to as a middle plate body) of substantially rectangular plate. Rectangular protrusions 332B are formed at the front and rear portions of the middle plate body 332 on the right side of the middle plate body 332. The first through-holes 332C are formed in the protrusions 332B. Another protrusion 332D is formed at the middle portion of the middle plate body 332 on the right side of the middle plate body 332.

A first circular opening 332E having a diameter substantially equal to that of the first holder opening 322D is formed at the center of the middle plate body 332, and a set of four circular second openings 332F are formed on the diagonal axis, equal distance from the first opening 332E. A pair of rectangular third openings 332G are respectively formed at the left corners of the middle plate body 332. Semi-spherical recesses 332H are formed along Uy axis in front and rear of the opening 132E. A set of second through-holes 332I are respectively at the left corners of the middle plate body 332.

The holder supporting plate 340 includes a body 342 (hereinafter, referred to as a supporting body) of substantially rectangular body. First and second bending portions 344 and 346 are formed at the front and rear edges of the supporting body 342, and are bent ninety degrees from the supporting body 342 and integrally formed with the supporting body 342. First and second supporting brackets 344A and 346A which protrude upward are integrally formed with the first and second bending portions 344 and 346 along Ux axis at the center of the first and second bending portions 344 and 346. Formed in the first and second supporting brackets 344A and 346A are respectively formed first and second pin holes 344B and 346B for pivotally mounting the holder 320 to the holder supporting plate 340 by pins 325. Pins 325 are inserted into the first and second pin holes 344B and 346B of the first and second supporting brackets 344A and 346A which corresponds to the first and second pin holes 324B and 326B of the first and second holder brackets 324A and 326A. Thus the holder 320 is pivotally mounted to the holder supporting plate 340.

The holder supporting plate 340 has a symmetrical rectangular cut-away portions a the right-end. The rectangular cut-away are formed such that they are separated in Uy direction of the holder supporting plate 340 and are opposite to each other. The holder supporting plate 340 has a first protrusion 342A at center of Uy axis and second rectangular protrusions 342B on the front and rear sides of the first protrusions 342A. At both edges of the first protrusion 342A, guide members 342C are bent by ninety degrees and protruded upward. A cam member 342C is interposed between the guide members 342C, and is guided by the guide member 342C when the cam member 414 is moved in the left or right direction, in the Ux direction. Rectangular openings 342D are formed on the second protrusions 342B respectively.

The side cross section of the cam member 414 is substantially right-angled triangular and has a constant thickness, so that the cam member 414 has two side surfaces, a rear surface, and an inclined surface 414B. A tapped hole 414A is formed parallel to the normal line of the right side surface at the center portion of the right surface of the cam member 414. The screw portion 410D of the first regulating knob 410 is engaged with the tapped hole 414A of the cam member 414. The cam member 414 is provided on the first protrusion 342A of the holder supporting plate 340 and the inclined surface 414B makes contact with the holder 320. When the first regulating knob 410 is rotated, the inclined surface of the cam member 414 is moved in relation to the holder supporting plate 340, and thus the relative pivot angle with respect to the holder supporting plate 340 is regulated.

A third supporting bracket 348 is bent by ninety degrees and protruded upward at the right side end portion of the first protrusion 342A. At the center portion of the third supporting bracket 348 is formed a third pin hole 348A for rotatably mounting the first regulating knob 410 to the third supporting bracket 348.

The first knob 410 has a cylindrical head portion 410A, a pin portion 410B, a jaw 410C, and a screw portion 410D. A slot is formed on one end surface of the head portion 410A such that the first knob 410 can be rotated by a driver or the like, and the pin portion 410B is integrally protruded from the other end surface of the head portion 410A. The jaw 410C is integrally formed in the pin 410B on the side opposite to the head portion 410A, and the screw portion 410D is integrally formed in the jaw 410C. The outer diameter of the jaw 410C is a little smaller than that of the third pin hole 348A, and the first regulating knob 410 is inserted into the third regulating bracket 348 from the right to the left, and then an interposed member 412 having an outer diameter larger than that of the third pin hole 348 is interposed between the left side surface of the jaw 410C and the right side surface of the third supporting bracket 348 in order to rotatably mount the first regulating knob 410 to the third supporting bracket 348. The screw portion 410D of the first regulating knob 410 is engaged with the tapped hole 414A of the cam member 414.

When the head portion 410A of the first regulating knob 410 is rotated by a driver or manually, the first regulating knob 410 is not moved in the left or the right direction, i.e., in the Ux direction, but is rotated in place, and the cam member 414 engaged with the screw portion 410D of the first regulating knob 410 is moved in the left or the right direction, i.e., in the Ux direction. Then, the inclined surface 414B of the cam member 414 makes contact with the lower end of the third bending portion 328 of the holder 320, thereby pivoting the holder 320, and thus the relative pivot angle of the holder 320 with respect to the holder supporting plate 340.

At the center portion of the supporting body 342 is formed a first circular supporting opening 342E having a diameter substantially equal to the first holder opening 322D, and second circular supporting opening 342F are formed diagonal to the left front, right front, left rear, and right rear of the first supporting opening 342E and are separated from the first supporting opening 342E by a distance. Third rectangular supporting opening 342G are respectively formed at corner portions of the supporting body 342, and fourth rectangular supporting opening 342H are respectively formed on the right and left sides of the first and second supporting brackets 344 and 346.

Cut-away portions are symmetrically formed to the front and rear sides of the lengthwise middle position of the supporting body 342 at the left end of the supporting body 342, and the supporting body 342 has a third protrusion 342J at a middle position of the left end thereof, and fourth protrusions 342J at the front and rear portions of the left end thereof. Bosses 342K are respectively protruded upward in the fourth protrusions 342J of the supporting body 342. Mounted in surrounded relationship to each of the bosses 342K is the one end of the corresponding spring 329 the other end of which are inserted into the corresponding recess 322C of the holder 320. The springs urge the left ends of the holder 320 upward, thereby maintaining the left lower corner of the holder 320 in contact with the inclined surface 414B of the cam member 414. At positions to the interior of the first and second supporting brackets 344 and 346 are respectively formed pin holes 342M and 342L into which first and second guide pins 345 and 347 are fixedly inserted, and the first and second guide pins 345 and 347 are fixedly inserted to the pin hole 342M and 342L from below.

The first regulating plate 350 includes a body 352 (hereinafter, referred to as a first regulating plate body) of substantially rectangular plate. A rectangular cut-away portion 352A is formed at the right end of the first regulating plate body 352, and is bent downward by ninety degree at and protruded from the right edge of the cut-away portion 352A is a bracket 354 (hereinafter, referred to as a second regulating knob bracket) for rotatably mounting the second regulating knob 420 thereto. Formed in the second regulating knob bracket 354 is a pin hole into which a second regulating knob 420 is inserted and mounted. Cut-away portions 352B and 352E are respectively formed at the front and rear ends of the first regulating plate body 352 and are separated to the left by a distance from the lengthwise middle position of the first regulating body. Brackets 356 and 358 (hereinafter, referred to as third and fourth regulating brackets respectively) for rotatably mounting the third and fourth regulating knob 430 and 440 is bent downward by ninety degrees at and protruded from the right ends of the cut-away portions 352B and 352E. Pin holes 356A and 358A are respectively formed in the third and fourth regulating knob brackets 356 and 358 such that the third and fourth regulating knobs 430 and 440 are inserted into and mounted to the pin holes 356A and 358A.

The second regulating knob 420 is used to regulate the relative lengthwise ($U_x$-directional) position of the first regulating plate 350 with respect to the second regulating plate 380. The third regulating knob 430 is used in order to regulate the relative widthwise (Uy-directional) position of the holder supporting plate 340 with respect to the first regulating plate 350. The fourth regulating knob 440 is used to regulating the relative pivot angle of the holder supporting plate 340 with respect to the first regulating plate 350 about a heightwise (Uz-directional) axis.

When the second regulating knob 420 is rotated, the distance between the first regulating plate 350 and the second regulating plate 380, in relation to the screw portion 420D of the second regulating knob 420, becomes shorter or longer. Thus the relative lengthwise ($U_x$-directional) position of the first regulating plate 350 with respect to the second regulating plate 380 is regulated.

When the third regulating knob 430 is rotated, the distance between the first regulating plate 350 and the first side plate 360, in relation to the screw portion 430D of the third regulating knob 430, becomes shorter or longer. Thus the relative widthwise (Uy-directional) position of the holder supporting plate 340 with respect to the first regulating plate 350 is regulated.

When the fourth regulating knob 440 is rotated, the distance between the first regulating plate 350 and the second side plate 370, in relation to the screw portion 440D of the fourth regulating knob 440, becomes shorter or longer. Thus the relative pivotal position of the holder supporting plate 340 about a heightwise axis with respect to the first regulating plate 350 is regulated.

The shapes and the mounting manners of the second, third, and fourth regulating knobs 420, 430, and 440 are similar to those of the first regulating knob 410. Therefore the explanation about shapes and mounting manners of these are omitted.

Slits 352D are formed along the length of the first regulating body 352, in the Ux direction, at the front and rear portions of the right side of the first regulating plate body 352. A first circular opening 352E having a diameter equal to that of the first holder opening 322D is formed at the center of the first regulating plate body 362, and circular second openings 352F are formed on the diagonal axis, equal distance from the first opening 352E. Third rectangular openings 352G are respectively formed at the corners of the first regulating plate body 352.

Two first tapped holes 352H and two second tapped holes 352I for respectively mounting the first and second side plates 360 and 370 to the first regulating plate body 352 are formed at the front and rear portions of the first regulating plate body 352. Similarly, through-holes 352J are formed to the interior of the first and second tapped holes 352H and 352I and separated from the first and second tapped holes 352H and 352I. A slit 352K is formed in a widthwise direction, i.e., in the Uy direction, at a middle position of the first tapped holes 352H, and a rectangular opening 352M is formed at a middle position of the second tapped holes 352I. Slits 352N are respectively formed in a right or left direction, i.e., in the Ux direction, at the front and rear portions of the left side of the first regulating plate body 352.

Guide bosses 352P protruding downward are respectively formed at a middle position of the left third openings 352G and at a middle position of the right third openings 352G. The guide bosses 352P of the first regulating plate body 352 are guided by the guide slits 382G of the second regulating plate body 382.

The first side plate 360 is mounted to the first regulating plate body 352 at a front portion of the first regulating plate body 352. The first side plate 360 includes a body 362 (hereinafter, referred to as a first side plate body) in which a bending portion 364 is integrally formed on one side thereof (at the rear end thereof in the figures). Lengthwise (Ux-directional) slits 362A are respectively formed at the right and left portions of the first side plate body 362. The first side plate 360 is mounted to the first regulating plate 350 by inserting screws 366 into the slits 362A and then by engaging the screws 366 with the first tapped holes 352H of the first regulating plate 350. Spacers 366A are interposed between the first side plate 360 and head portions of the screws 366.

After the panel positioning device is assembled, the head portions of the screws 366 protruding from the upper surface of the first regulating plate 350 are protruded through the fourth supporting openings 342H of the holder supporting plate 340. Through-holes 362B are formed to the rear of the slits 362A at positions which correspond to the through-holes 352J of the first regulating plate 350 when the first side plate 360 is mounted to the first regulating plate 350.

A guide slit 362C extending from the left rear to the right front is formed in the first side plate 360 at a middle position of the slits 362A. When the panel positioning device is assembled, the first guide pin 345 of the holder supporting plate 340 is penetrated into and guided by the slit 352K formed in the first regulating plate 350 and the guide slit 362C formed in the first side plate 360.

Integrally formed at the right end of the first side plate 360 is a bracket 368 (hereinafter, referred to as a first side bracket) which is bent by ninety degree and protruded downward, and formed in the first side bracket 368 is a tapped hole 368A which is engaged with the screw portion 430D of the third regulating knob 430. When the screw 366 is engaged with the first tapped hole 352H and the third regulating knob 430 is rotated, the screw 366 and the spacer 366A are guided by the slit 362A and the first guide pin 345 of the holder supporting plate 340 is guided by the slit 352K formed in the first regulating plate 350 and the guide slit 362C formed in the first side plate 360.

When the third knob 430 is rotated, the screws 366 and the spacers 366A are guided by the slits 362A of the first side plate 360, and the first guide pin 345 of the holder supporting plate 340 is guided by the slit 352K formed in the first regulating plate 350 and the guide slit 362C of the first side plate 360. Then, the distance between the first side bracket 368 of the first side plate 360 and the third regulating knob bracket 356 of the first regulating plate 350 becomes longer or shorter, and the holder supporting plate 340 is moved by the guide pin 345 of the holder supporting plate 340 with respect to the first regulating plate 350 in the lengthwise direction thereof, in the Uy direction. The first regulating plate 350 is mounted so as not to be width wisely movable with respect to the second regulating plate 350 and the first and second side plates 360 and 370 by the guide slits 382G of the second regulating plate 380 and the guide bosses 352P of the first regulating plate 350. Therefore the positions of the first and second regulating plates 350 and 380, the middle plate 330, and the first and second side plates 360 and 370 remain fixed and the holder supporting plate 340, the holder 320, and the panel (not shown) are moved in the lengthwise direction of the apparatus, in the Uy direction.

The second side plate 370 is mounted to the first regulating plate body 352 at a rear portion of the first regulating plate body 352 The second side plate 370 includes a body 372 (hereinafter, referred to as a second side plate body) with which a bending portion 374 is integrally formed on one side thereof. Slits 372A are respectively formed along the length of the second side plate body 372, i.e., in the Ux direction, at right and left portions of the second side plate body 372. The second side plate 370 is mounted to the first regulating plate 350 by inserting the screws 376 into the slits 372A and then by engaging the screws 376 with second tapped holes 352I of the first regulating plate 350. Spacers 376A are interposed between the second side plate 370 and the head portions of the screw 376. When the screws 376 are engaged with the second tapped holes 352I and the fourth regulating knob 440 is rotated, the screws 376 and the spacers 376A are guided by the slits 372A.

After the panel positioning device 300 is assembled, the head portions of the screws 376 protruding from the upper surface of the first regulating plate 350 are protruded through the fourth supporting openings 342H of the holder supporting plate 340. Through-holes 372B are formed to the front of the slits 372A at positions which correspond to the through-holes 352J of the first regulating plate 350 when the second side plate 370 is mounted to the first regulating plate 350.

A widthwise guide slit 372C is formed at a middle position of the slits 372A. After the panel positioning device is assembled, the second guide pin 347 of the holder supporting plate 340 is penetrated into and guided by the opening 352M formed in the first regulating plate 350 and the guide slit 372C which is formed in the second side plate 360 in a widthwise direction, in the Uy direction.

Integrally formed at the right end of the second side plate 370 is a bracket 378 (hereinafter, referred to as a second side bracket) which is bent by ninety degree and protruded downward, and formed in the second side bracket 378 is a tapped hole 378A which is engaged with the screw portion 440D of the third regulating knob 440. When the screw 376 is engaged with the second tapped hole 352I and the fourth regulating knob 440 is rotated, the screw 376 and the spacer 376A are guided by the slit 372A and the second guide pin 347 of the holder supporting plate 340 is guided by the opening 352M formed in the first regulating plate 350 and the guide slit 372C formed in the second side plate 370.

In case where the fourth regulating knob 440 is rotated to regulate the apparatus, the distance between the second side bracket 378 of the side plate 370 and the fourth regulating knob bracket 358 becomes shorter or longer. The screws 376 engaged with the second screw holes 352I of the first regulating plate 350 are guided by the lengthwise slits 372A of the second side plate 370 and is moved in the lengthwise direction relatively with respect to the second side plate 370.

The second regulating plate 380 has a body 382 (hereinafter, referred to as a second regulating plate body) of substantially rectangular plate. First rectangular protrusions 382A in which first tapped holes 382B are respectively formed are protruded parallel to each other at the front and rear corners of the right side of the second regulating plate body 382. Second semi-spherical protrusions 382C are respectively protruded at the front and rear corners of the left side of the second regulating plate body 382.

The middle plate 330, the holder supporting plate 340, and the first regulating plate 350 are mounted to the second regulating plate 380 by mounting members 327 and screws 323. Each of the mounting members 327 has a substantially inversely U-shaped cross section and is a plate of a length, and has a resilient portion 327A of semi-spherical shape, which protrudes downward at a middle portion thereof. Mounting portions 327B are formed at the both edges of the mounting members 327 and are bent by ninety degree. A through-hole 327C is formed in each of the mounting portion 327B.

The mounting members 327 are penetrated through the second holder openings 322E and mounted such that the resilient portions 327A thereof resiliently press the resilient portions 327A of the middle plate 330 and a connecting portion between the third openings 332G respectively. The screws 323 are engaged with the tapped-holes 382H of the second regulating plate 380, and spacers 323A are interposed between the screws 323 and the second regulating plate 380.

A first circular opening 382E, which has a diameter equal to that of the first holder opening 322D, is formed at the center of the second regulating plate body 382. A set of four second circular openings 382F are formed on the diagonal axis, equal distance from the first opening 382E. A pair of guide slits 382G are respectively formed between the first opening 382E and the right and left ends of the second regulating plate body 382 along the length of the second regulating plate body 382, i.e., in the Ux direction. Bosses 352P formed in the first regulating plate 350 are respectively inserted into and guided by the guide slits 382G. Third tapped holes 382H are formed to the front and rear sides of each guide slits 382G so as to be adjacent to the front and rear sides of the second regulating plate body 382.

A first rectangular plate bracket 386 which is bent downward by ninety degrees from the second regulating plate body 382 is protruded at the right edge which is orthogonal to the first protrusions 382A at the right end of the second plate body 382. A tapped hole 386A to be used with the screw-portion of the second regulating knob 420 is formed at the center portion of the first bracket 386. A through-hole 386B to be used with rotational mounting of one side of the fifth regulating knob 450 is formed to the lower side of the tapped hole 386A. Each rectangular protrusions 386C has a tapped hole 386D. The holes are formed on the front and rear sides of the first bracket 386 at the lower portions of the first bracket 386. Upper and lower pin holes 386F are formed to the front and rear sides of the through-hole 386B respectively and separated from the through-hole 386B by a widthwise distance, such that the corresponding upper and lower pin holes 386F of the front and rear sides of the first bracket 386 are located at the same heightwise positions. A pair of pins 386G are inserted into and fixed to the pin holes 386F respectively.

Bending portions 384 are formed at the front and rear ends of the second regulating plate body 382 respectively. The bending portions 384 are integrally formed with the second regulating plate body 382 so as to be bent downward by ninety degrees from the front and rear ends of the second regulating plate body 382.

Third brackets 389 are protruded downward from the right and left sides of each of the guide protrusion 384. A pin hole 389A is formed at a lower portion of each of the third brackets 389, and pins 389B are inserted into and fixed to the pin holes 389A.

A second bracket 388 is bent by ninety degree and protruded from the front and rear sides of the second protrusion 382C at the left end of the second regulating plate body 382. The second bracket 388 is a U-shaped plate consisting of a front protrusion which is bent and protruded from the front second protrusion 382C and a rear protrusion which is bent and protruded from the rear second protrusion 382C. Two protrusions are connected by a connecting portion, and a through-hole 388A is formed at the center portion of the connecting portion to which the other side of the fifth regulating knob 450 is rotatably mounted. Tapped holes 388B are formed to the front and rear sides respectively of the through-hole 388A. Two pin holes 388C are formed in the front protrusion of the second bracket 388, and two pin holes 388C are formed in the rear protrusion of the second bracket 388 at positions corresponding to the heights of the pin holes 388C of the front protrusion of the second bracket 388. A set of pins 388D are inserted into and fixed to the pin holes 388C of the second bracket 388 respectively. The second pins 386G and 388D which are fixed to the pin holes 386F and 388C of the first and second brackets 386 and 388 are inserted into guide slits 390A which are formed in the side frame (390) in a heightwise direction, i.e., in the Ux direction. The guide slits 390A guide the second regulating plate 380 in conjunction with the second pins 386G and 388D when the relative heightwise position of the second regulating plate 380 in relation to the side frame 390 is varied.

The third regulating plate 385 has a substantially box-like shape in which the upper and lower sides thereof are opened. Linearly inclined slits 385A, extending from the upper left to the lower right, are formed in the front and rear side walls of the third regulating plate 385 at positions each corresponding to the positions of the first pins 389B fixed to the third brackets 389 of the second regulating plate 380. After the panel positioning device 300 is assembled, the first pins 389B are inserted and penetrated into the inclined slits 385A of the third regulating plate 385. As shown in FIG. 6, two inclined slits 385A are formed in each of the side walls, and these slits 385A guide the first pins 395B in more stable manner.

Protrusions 385B are protruded to the right and left of the front and rear side walls of the third regulating plate 385. Each of the protrusions 385B of the third regulating plate 385 has a lower edge equal to the lower edge of the main side wall of the third regulating plate 385. The upper edge of the protrusion is located at a position lower than the upper edge of the side wall of the third regulating plate 385. The protrusions 385B of the third regulating plate 385 are inserted into the second slits 390B formed in the side frame 390. This subassembly guide the third regulating plate 385, when the third regulating plate 385 engaged with the screw portion 450D of the fifth regulating knob 450, along the lengthwise direction, in the Ux direction while the fifth regulating knob 450 is rotating.

A tapped hole 385C is formed at the center portion of the third regulating plate 385 on the right side wall thereof. The screw portion 450D of the fifth regulating knob 450 is engaged with the tapped hole of the third regulating plate 385. The fifth regulating knob 450 is used to regulate the relative heightwise (Uz-directional) position of the holder supporting plate 340 in relation to the side frame 390.

The fifth regulating knob 450 has a cylindrical head portion 450A, a pin portion 450B, a jaw 450C, and a screw portion 450D. A slot is formed on one end surface of the head portion 450A so that the fifth regulating knob 450 is regulated by a driver, and the pin portion 450B is integrally protruded from the other end surface of the head portion 450A. The pin portion 450B is rotatably inserted into the through-hole 386B formed in the first bracket 386 of the second regulating plate 380 and the through-hole 390C formed in the side frame 390. The jaw 450C is integrally formed in the pin portion 450B on the opposite side of the head portion 450A, and the screw portion 450D is integrally formed in the jaw 450C. The outer diameter of the jaw 450C is smaller than the through-hole 386B formed in the first bracket 386 of the second regulating plate 380 and the through-hole 390C formed in the side frame 390. After the fifth regulating knob 450 is inserted into the through-holes 386B and 390C, an interposed member 452 which has a diameter larger than those of the through-holes 386B and 390C is interposed between the first bracket 386 of the second regulating plate 380 and the right side surface of the jaw 450C, and thus the fifth regulating knob 450 is rotatably mounted to the second regulating plate 380. The screw portion 450D of the fifth regulating knob 450 is engaged with the tapped hole 385C of the third regulating plate 385.

When the head portion 450A of the fifth regulating knob 450 is rotated, the fifth regulating knob 450 is rotated in place due to the existence of the jaw 450C. The interposed member 452, results in no movement in the right or left direction, in the Ux direction, the third regulating plate 385, engaged with the screw portion 450D of the fifth regulating knob 450, is moved in the lengthwise direction of the apparatus, in the Ux direction. As the third regulating plate 385 is moved in the lengthwise direction of the apparatus, in the Ux direction, the first pins 389B fixed to the third bracket 389 of the second regulating plate 380 are guided by the inclined slits 385A of the third regulating plate 380 and thus moves upward or downward. Therefore, the second regulating plate 380 has a upward or downward movement.

Hereinafter, the operations of the panel positioning device 300 according to the embodiment of the present invention will be explained in connection with the functions of the regulating knobs 410, 420, 430, 440, and 450.

When the head portion 410A of the first regulating knob 410 is rotated manually or by a driver, the first regulating knob 410 is not moved in the right and left direction, in the Ux direction but is rotated in place. The cam member 414, engaged with the screw portion 410D of the first regulating knob 410, is moved in the right and left direction, in the Ux direction. Then, since the inclined portion 414B of the cam member 414 remain in contact with the lower end of the third bending portion 328 of the holder 320, the holder 320 is pivoted about the hinge axes of the first and second supporting brackets 344 and 346 in the θy direction and the springs 329 press the holder 320 in the θy direction (especially, in the clockwise direction in FIG. 5A). The θy directional angle of the panel 320 is regulated when the holder 320 to which the panel (not shown) is fixed is pivoted in the θy direction by the regulation of the first regulating knob 410.

When the second regulating knob 420 is rotated, the second regulating knob 420 is not moved in the right or left direction, i.e., in the Ux direction but is rotated in place. The distance between the first bracket 386 of the second regulating plate 380, which is engaged with the screw portion 420D of the second regulating knob 420, and the second regulating knob bracket 354 of the first regulating plate 350 becomes shorter or longer. Thus the first regulating plate 350 is moved in the lengthwise direction, in the Ux direction with the position of the second regulating plate 380. That is, when the first regulating plate 350 is moved in the lengthwise direction thereof on the second regulating plate 380 by the rotation of the second regulating knob 420. Then, the guide slits 382G of the second regulating plate 380 make contact with the guide bosses 352P of the first regulating plate 350 and guide the movement of the first regulating plate 350. The positions of both the middle plate 330 and the second regulating plate 380 remains fixed, the first and second guide pins 345 and 347 respectively penetrated into the widthwise slit 352K of the first regulating plate 350 and the guide slit 362C of the first side plate 360, the opening 352M of the first regulating plate 350, and the widthwise slit 372C of the second side plate 370, and thus the holder supporting plate 340 mounted to the second regulating plate 350 so as to be fixed in the lengthwise direction, in the Ux direction. This subassembly is moved along with the first regulating plate 350 in the lengthwise direction, in the Ux direction. As the holder supporting plate 340 is moved in the lengthwise direction thereof, in the Ux direction, the holder 320 pivotally mounted to the holder supporting plate 340 and the panel (not shown) fixed to the holder 320 is moved in the lengthwise direction thereof, in the Ux direction.

When the third knob 430 is rotated, the screws 366 and the spacers 366A are guided by the slits 362A of the first side plate 360. The first guide pin 345 of the holder supporting plate 340 is guided by the slit 352K formed in the first regulating plate 350 and the guide slit 362C of the first side plate 360. As a result, the distance between the first side bracket 368 of the first side plate 360 and the third regulating knob bracket 356 of the first regulating plate 350 becomes longer or shorter, and the holder supporting plate 340 is moved by the guide pin 345 of the holder supporting plate 340 with respect to the first regulating plate 350 in the lengthwise direction thereof, in the Uy direction. The first regulating plate 350 is mounted so as to be fixed with respect to the second regulating plate 380 by the guide slits 382G of the second regulating plate 380 and the guide bosses 352P of the first regulating plate 350. Therefore the positions of the first and second regulating plates 350 and 380, the middle plate 330, and the first and second side plates 360 and 370 remain fixed and the holder supporting plate 340, the holder 320, and the panel (not shown) are moved in the lengthwise direction of the apparatus, i.e., in the Uy direction.

When the apparatus is regulated by the rotation of the fourth regulating knob 440, the distance between the second side bracket 378 of the second side plate 370 and the fourth knob bracket 358 becomes shorter or longer, and thus the screws 376 engaged with the second tapped holes 352I of the first regulating plate 350 and the spacers 378A are respectively guided by the lengthwise slits 372A of the second side plate 370 and are moved with respect to the second side plate 370, i.e., in the lengthwise direction of the apparatus, in the Ux direction. Then, the second guide pin 147 inserted into the holder supporting plate 120 is moved in the lengthwise direction by the widthwise slit 172C of the second side plate 170, and the holder supporting plate 320 is rotated in the θz direction about the first guide pin 345 penetrated into the slit 352K of the first regulating plate 350 and the guide slit 362C formed in the first side plate 360.

When the head portion 450A of the fifth regulating knob 450 is rotated, the fifth regulating knob 450 is rotated in place due to the existence of the jaw 450C and the interposed member 452 so as not to be movable in the right or left direction, in the Ux direction, and the third regulating plate 385 engaged with the screw portion 450D of the fifth regulating knob 450 is moved in the lengthwise direction of the apparatus, in the Ux direction. As the third regulating plate 385 is moved in the lengthwise direction of the apparatus, in the Ux direction, the first pins 389B fixed to the third bracket 389 of the second regulating plate 380, are guided by the inclined slits 385A of the third regulating plate 380 and moved upward or downward, and thus the second regulating plate 380 is moved upward or downward. Then, the second pins 386G and 388D fixed to the first and second brackets 386 and 388 are inserted into the guide slits 390A which are formed in the side frame in the heightwise direction, i.e., in the Uz direction and guided by the guide slits 390A.

Therefore, according to the panel positioning device of the present invention, since, when the fifth regulating knob 450 is rotated, the third regulating plate 385 is moved in the lengthwise direction, i.e., in the Ux direction, the first pins 389B fixed to the third brackets 389 of the second regulating plate 380 are moved upward or downward through the linear inclined slits 385A of the third regulating plate 385 and the second regulating plate 380 is moved upward or downward. The resulting heightwise (Uz-directional) displacement of the panel 310 is regulated so as to be proportional to the rotational displacement of the fifth regulating knob 450.

From the above discussion, it will be appreciated that the present invention provides systems and methods for improving panel positioning in which a simple and accurate heightwise displacement of an AMA or LCD panel is linearly regulated by knobs.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A panel positioning device comprising:
   a holder to which a panel is mounted;
   a holder supporting plate to which the holder is rotatably mounted;
   a middle plate interposed between the holder and the holder supporting plate;
   a first regulating plate located below the holder supporting plate;
   a second regulating plate located below the first regulating plate;
   a first side plate provided on one widthwise side of the first regulating plate;
   a second side plate provided on the other widthwise side of the first regulating plate;
   a cam member provided on the holder supporting plate so as to make contact with one side of the holder, and in which a tapped hole is formed;
   a first regulating knob provided on one side of the holder supporting plate and provided with a screw portion engaged with the tapped hole of the cam member, for regulating a relative pivot angle of the holder with respect to the holder support plate;
   a second regulating knob provided on one side of the first regulating plate and provided with a screw portion engaged with the second regulating plate, for regulating a relative lengthwise position of the first regulating plate with respect to the second regulating plate;
   a third regulating knob provided on one side of the first regulating plate and provided with a screw portion engaged with the first side plate, for regulating a relative widthwise position of the holder support plate with respect to the first regulating plate;
   a fourth regulating knob provided on one side of the first regulating plate and provided with a screw portion engaged with the second side plate, for regulating a relative pivot angle of the holder support plate about one heightwise axis of the first regulating plate with respect to the first regulating plate;
   a fifth regulating knob for regulating a regulative heightwise position of the holder support plate with respect to a side frame; and
   means for linearly regulating a relative heightwise position of the second regulating plate with respect to the side frame by engaging with the fifth regulating knob.

2. A panel positioning device according to claim 1, wherein the means for linearly regulating heightwise position of the second regulating plate is a third regulating plate which is lengthwisely movably mounted to the side frame, and with which the fifth regulating knob is engaged at one side thereof.

3. A panel positioning device according to claim 2, wherein at least one first pin is fixed to the second regulating plate, the first pin being inserted and penetrated into a corresponding side of the third regulating plate, the third regulating plate having an inclined slit extending from an upper portion of one side thereof to a lower portion of the other side thereof.

4. A panel positioning device according to claim 3, wherein the second regulating plate has at least one bracket to which the first pin is fixed, the inclined slit being formed on a side wall of the third regulating plate corresponding to the bracket of the second regulating plate.

5. A panel positioning device according to claim 3, wherein the inclined slit is linear.

6. A panel positioning device according to claim 3, wherein the inclined slit is formed on both sides of the third regulating plate.

7. A panel positioning device according to claim 6, wherein two inclined slits are respectively formed on both sides of the third regulating plate.

8. A panel positioning device according to claim 3, wherein at least one second pin is fixed to the second regulating plate, the second pin being inserted into and penetrated into the side frame, the side frame having a guide slit for guiding the second regulating plate when the relative heightwise position of the second regulating plate with respect to the side frame is varied.

9. A panel positioning device according to claim 2, wherein the fifth regulating knob has a head portion, a pin portion rotatably integrally protruded from the head portion and rotatably inserted into both a through-hole formed in the side frame and a through-hole formed in the second regulating plate, a jaw integrally formed in the pin portion on the opposite side of the head portion, and a screw portion integrally formed with the jaw and engaged with the third regulating plate.

10. A panel positioning device according to claim 9, wherein the fifth knob has an interposing member interposed between the second regulating plate and the jaw.

11. A panel positioning device according to claim 10, wherein the interposing member has an outer diameter larger than both diameters of both the through-hole of the side frame and the through-hole of the second regulating plate.

12. A panel positioning device according to claim 9, wherein at least one protrusion is formed on both sides of the lower end of the third regulating plate, the protrusion being inserted into a corresponding slit formed in the side frame, thus guiding the third regulating plate when the third regulating plate engaged with the screw portion of the fifth regulating knob is lengthwisely moved during rotation of the fifth regulating knob.

13. A panel positioning device according to claim 9, wherein the head portion of the fifth regulating knob has a cylindrical shape and has a recess one end section thereof.

14. A panel positioning device according to claim 1, wherein the cam member has an inclined surface making contact with one side of the holder, the relative pivot angle of the holder with respect to the holder supporting plate being regulated when the inclined surface is moved with respect to the holder supporting plate during rotation of the first regulating knob.

15. A panel positioning device according to claim 14, wherein a spring for urging the holder upward is provided between the holder and the holder supporting plate on one side opposite to the side of the holder which makes contact with the inclined surface of the cam member.

16. A panel positioning device comprising:
a holder to which a panel is mounted;
a holder supporting plate to which the holder is rotatable mounted;
a middle plate interposed between the holder and the holder supporting plate;
a first regulating plate located below the holder supporting plate;
a second regulating plate located below the first regulating plate;
a first side plate provided on one widthwise side of the first regulating plate;
a second side plate provided on the other widthwise side of the first regulating plate;
a cam member provided on the holder supporting plate so as to make contact with one side of the holder, and in which a tapped hole is formed;
a first regulating knob provided on one side of the holder supporting plate and provided with a screw portion engaged with the tapped hole of the cam member, for regulating a relative pivot angle of the holder with respect to the holder support plate;
a second regulating knob provided on one side of the first regulating plate and provided with a screw portion engaged with the second regulating plate, for regulating a relative lengthwise position of the first regulating plate with respect to the second regulating plate;
a third regulating knob provided on one side of the first regulating plate and provided with a screw portion engaged with the first side plate, for regulating a relative widthwise position of the holder support plate with respect to the first regulating plate;
a fourth regulating knob provided on one side of the first regulating plate and provided with a screw portion engaged with the second side plate, for regulating a relative pivot angle of the holder support plate about one heightwise axis of the first regulating plate with respect to the first regulating plate;
a fifth regulating knob for regulating a regulative heightwise position of the holder support plate with respect to a side frame; and a third regulating plate lengthwisely movably mounted to the side frame, and with which the fifth regulating knob is engaged at one side thereof;
and wherein at least one first pin is fixed to the second regulating plate, the first pin being inserted and penetrated into a corresponding side of the third regulating plate, the third regulating plate having an inclined slit extending from an upper portion of one side thereof to a lower portion of the other side thereof, the second regulating plate having at least one bracket to which the first pin is fixed, the inclined slit being formed on a side wall of the third regulating plate corresponding to the bracket of the second regulating plate.

17. A panel positioning device according to claim 16, wherein the inclined slit is formed on both sides of the third regulating plate.

18. A panel positioning device according to claim 17, wherein two inclined slits are respectively formed on both sides of the third regulating plate.

19. A panel positioning device according to claim 16, wherein the fifth regulating knob has a head portion, a pin portion rotatably integrally protruded from the head portion and rotatably inserted into both a through-hole formed in the side frame and a through-hole formed in the second regulating plate, a jaw integrally formed in the pin portion on the opposite side of the head portion, and a screw portion integrally formed with the jaw and engaged with the third regulating plate, the head portion of the fifth regulating knob having a cylindrical shape and having a recess on one end section thereof.

20. A panel positioning device according to claim 19, wherein the fifth knob has an interposing member interposed between the second regulating plate and the jaw.

21. A panel positioning device according to claim 20, wherein the interposing member has an outer diameter larger than both diameters of both the through-hole of the side frame and the through-hole of the second regulating plate.

22. A panel positioning device according to claim 19, wherein at least one protrusion is formed on both sides of the lower end of the third regulating plate, the protrusion being inserted into a corresponding slit formed in the side frame, thus guiding the third regulating plate when the third regulating plate engaged with the screw portion of the fifth regulating knob is lengthwisely moved during rotation of the fifth regulating knob.

23. A panel positioning device according to claim 16, wherein at least one second pin is fixed to the second regulating plate, the second pin being inserted into and penetrated into the side frame, the side frame having a guide slit for guiding the second regulating plate when the relative heightwise position of the second regulating plate with respect to the side frame is varied.

24. A panel positioning device according to claim 16, wherein the cam member has an inclined surface making contact with one side of the holder, the relative pivot angle of the holder with respect to the holder supporting plate being regulated when the inclined surface is moved with respect to the holder supporting plate during rotation of the first regulating knob.

25. A panel positioning device according to claim 24, wherein a spring for urging the holder upward is provided between the holder and the holder supporting plate on one side opposite to the side of the holder which makes contact with the inclined surface of the cam member.

* * * * *